US012810900B2

(12) United States Patent
Kinuta et al.

(10) Patent No.: US 12,810,900 B2
(45) Date of Patent: Nov. 24, 2026

(54) ELECTRONIC DEVICE AND VIDEO MANAGEMENT METHOD

(71) Applicant: Panasonic Intellectual Property Management Co., Ltd., Osaka (JP)

(72) Inventors: Shohei Kinuta, Osaka (JP); Toshinari Suo, Osaka (JP); Taizou Aoki, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 19/078,401

(22) Filed: Mar. 13, 2025

(65) Prior Publication Data

US 2025/0299700 A1 Sep. 25, 2025

(30) Foreign Application Priority Data

Mar. 19, 2024 (JP) ................................ 2024-044078

(51) Int. Cl.
*G11B 27/031* (2006.01)

(52) U.S. Cl.
CPC .................................. *G11B 27/031* (2013.01)

(58) Field of Classification Search
CPC .... G11B 27/031; G11B 27/34; H04N 23/957; H04N 23/632; H04N 23/64; H04N 23/67; H04N 23/951; H04N 5/2621; H04N 5/9206; H04N 13/183; H04N 21/4856; H04N 1/2112; G08B 13/19676
USPC ........................................................ 386/224
See application file for complete search history.

(56) References Cited

U.S. PATENT DOCUMENTS

2004/0103233 A1 5/2004 Shinkai et al.
2018/0227609 A1* 8/2018 Hwang ............ H04N 21/23109
2021/0352218 A1 11/2021 Watanabe et al.
2023/0137452 A1* 5/2023 Sugimori ............... G06V 20/35
386/282

FOREIGN PATENT DOCUMENTS

JP 2004-187275 A 7/2004
JP 2005-167377 A 6/2005
JP 2020-102821 A 7/2020

* cited by examiner

*Primary Examiner* — Thai Q Tran
*Assistant Examiner* — Nienru Yang
(74) *Attorney, Agent, or Firm* — Renner, Otto, Boisselle & Sklar, LLP

(57) ABSTRACT

An electronic device for managing a video in a scenario including a plurality of sections includes: a display that displays information; an input interface that inputs a user operation; and a controller that controls the display in accordance with the user operation input by the input interface. The controller causes the display to display a rating screen to acquire rating information from the input interface, the rating screen prompting the user to rate the video associated with each section of the plurality of sections, the rating information indicating user rating of the video, and generates management data in accordance with the acquired rating information, the management data managing a priority order in which video information is arranged on an edit screen for editing a plurality of videos associated with the plurality of sections, and the video information indicating each of the videos.

14 Claims, 27 Drawing Sheets

10

Fig. 6

D1

CUT ALLOCATION DATA

| Cut no. | Script | Comp-osition | Shooting time | Shooting location | Memo | Shooting comp. flag | Video meta-data list |
|---|---|---|---|---|---|---|---|
| 0001 | XXXX | XXXX | XXXX | XXXX | XXXX | OFF(/ON) | — |
| 0002 | XXXX | XXXX | XXXX | XXXX | XXXX | OFF(/ON) | — |
| ... | ... | ... | ... | ... | ... | ... | ... |

44
45
240
(Live view image)
46
X
Y
SET TIMER 44a
240
OFF
5 sec.
10 sec.
15 sec.
(Live view image)
46
X
Y
START RECORDING 48
MARKING
45
240
5
(Live view image)
46a
X
Y 48
MARKING
45
47
240
3 sec. /10 sec.
(Live view image)
46a
X
Y

*Fig. 15*

D2

| VIDEO METADATA (CUT NO. N, NUMBER OF TAKES M) | |
|---|---|
| VIDEO FILE NAME | XXX_N_M |
| RATING INFORMATION | XXXX |
| TIMER PERIOD | XXXX |
| MARKER INFORMATION | XXXX |

ELECTRONIC DEVICE AND VIDEO MANAGEMENT METHOD

TECHNICAL FIELD

The present disclosure relates to an electronic device and a video management method for managing video shooting in a scenario including a plurality of sections such as cuts.

BACKGROUND ART

JP 2004-187275 A discloses a video program creation support system that can consistently use a scenario in an electronic file format from a planning construction stage to an editing stage. The video program creation support system includes an imaging apparatus that creates take metadata in configuration table metadata for each take and associates content data of the take and the take metadata with a cut in the program metadata. In this imaging apparatus, when only one take is associated with the selected cut at the end of imaging of the cut, this take is automatically set to OK (adopted). On the other hand, when a plurality of takes are associated with the cut, one take is set to OK and the other takes are set to NG (not adopted) on the basis of the OK/NG selection operation of the camera operator.

JP 2020-102821 A discloses an electronic device that suitably displays an image indicating content so as to improve convenience. The electronic device displays a selected image indicating one content included in a corresponding group in each section on a timeline in which a plurality of sections corresponding to a plurality of groups are displayed side by side along a time axis. Further, the electronic device displays the unselected image indicating the content that is not the content of the selected image among the plurality of pieces of content included in the group corresponding to the section in association with the section. Patent Document 2 discloses arranging a plurality of thumbnail images of the same group such as a selected image and an unselected image in a recording order of videos. As a result, the user can grasp the number of times the video has been captured only by confirming the order of the thumbnail images.

SUMMARY

The present disclosure provides an electronic device and a video management method that can facilitate edit of video with a scenario including a plurality of sections.

In the present disclosure, an electronic device for managing a video in a scenario including a plurality of sections includes: a display that displays information; an input interface that inputs a user operation; and a controller that controls the display in accordance with the user operation input by the input interface. The controller causes the display to display a rating screen to acquire rating information from the input interface, the rating screen prompting the user to rate the video associated with each section of the plurality of sections, the rating information indicating user rating of the video, and generates management data in accordance with the acquired rating information, the management data managing a priority order in which video information is arranged on an edit screen for editing a plurality of videos associated with the plurality of sections, and the video information indicating each of the videos.

In the present disclosure, a video management method for managing a video in a scenario including a plurality of sections includes: causing, by a controller of an electronic device, a display to display a rating screen to acquire rating information from an input interface, the rating screen prompting a user to rate the video associated with each section of the plurality of sections, and the rating information indicating user rating of the video; and generating, by the controller, management data in accordance with the acquired rating information, the management data managing a priority order in which video information is arranged on an edit screen for editing a plurality of videos associated with the plurality of sections, and the video information indicating each of the videos.

According to the electronic device and the video management method of the present disclosure, it is possible to facilitate to edit video with a scenario including a plurality of sections.

BRIEF DESCRIPTION OF DRAWINGS

FIG. 6 is a diagram illustrating a data structure of cut allocation data in the information support terminal;

FIG. 15 is a diagram illustrating a data structure of video metadata in the information support terminal;

DETAILED DESCRIPTION

Embodiments will be described in detail below with reference to the drawings as appropriate. However, detailed description of already well-known matters and redundant description of substantially the same configuration may be omitted. Note that the accompanying drawings and the following description are provided for those skilled in the art to fully understand the present disclosure, and are not intended to limit the subject matter described in the claims.

First Embodiment

In a first embodiment of the present disclosure, a system using an electronic device separate from an imaging apparatus that executes video shooting will be described.

1. Configuration

An imaging system according to the first embodiment of the present disclosure will be described with reference to FIG. 1.

Figure 1:
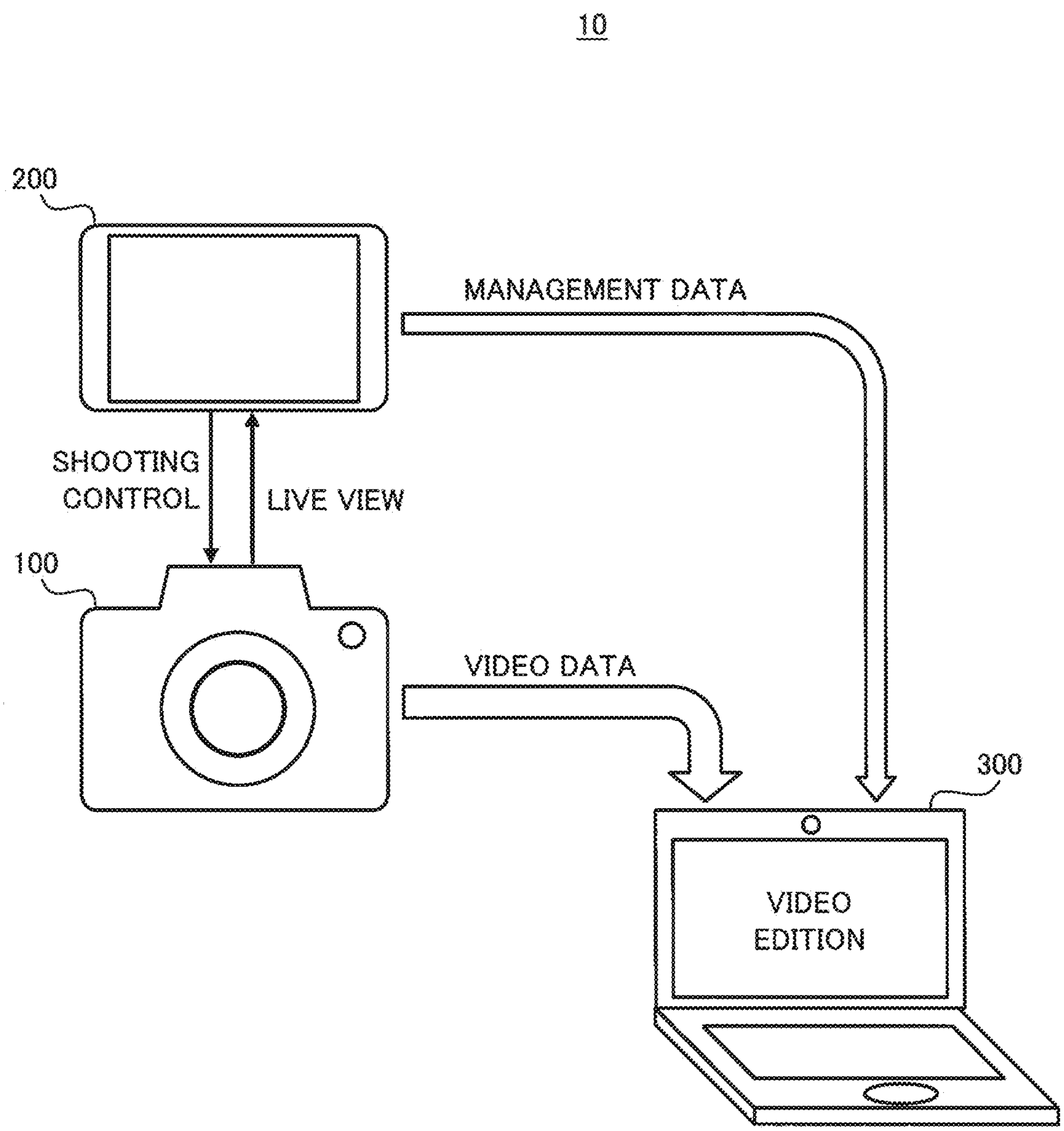
FIG. 1 is a diagram illustrating a configuration of an imaging system according to a first embodiment of the present disclosure.

For example, as illustrated in FIG. 1, a system 10 includes a digital camera 100, an information support terminal 200, and a video editing personal computer (PC) 300. In the present system 10, the digital camera 100 and the information support terminal 200 are data-communicably connected by wired communication or wireless communication, for example.

The present system 10 is applicable to a user creating a desired video work by shooting and editing a plurality of videos with the digital camera 100, for example. For example, the present system 10 provides information support useful for a series of workflows in which a user plans a scenario indicating a concept of a video work, repeatedly shoot a video according to a plurality of cuts that are divided from the scenario, and edits a plurality of shot videos.

In the present system 10, the information support terminal 200 can manage a scenario of a video work, and control the digital camera 100 so as to manage video shooting for each cut, for example. For example, a live view image in the digital camera 100 can be viewed on the information support terminal 200. The video data of the shooting result of the digital camera 100 is edited in the video editing PC 300. The present system 10 uses data managed by the information support terminal 200 from the viewpoint of facilitating video editing in the video editing PC 300 and the like.

In the present system 10, the video editing PC 300 may or may not be communicably connected to one or both of the digital camera 100 and the information support terminal 200. For example, data from the digital camera 100 and/or the information support terminal 200 may be input to the video editing PC 300 via a portable recording medium such as a memory card. The present system 10 may not include the video editing PC 300.

1.1. Configuration of Digital Camera

A configuration of the digital camera 100 in the present embodiment will be described with reference to FIG. 2.

Figure 2:
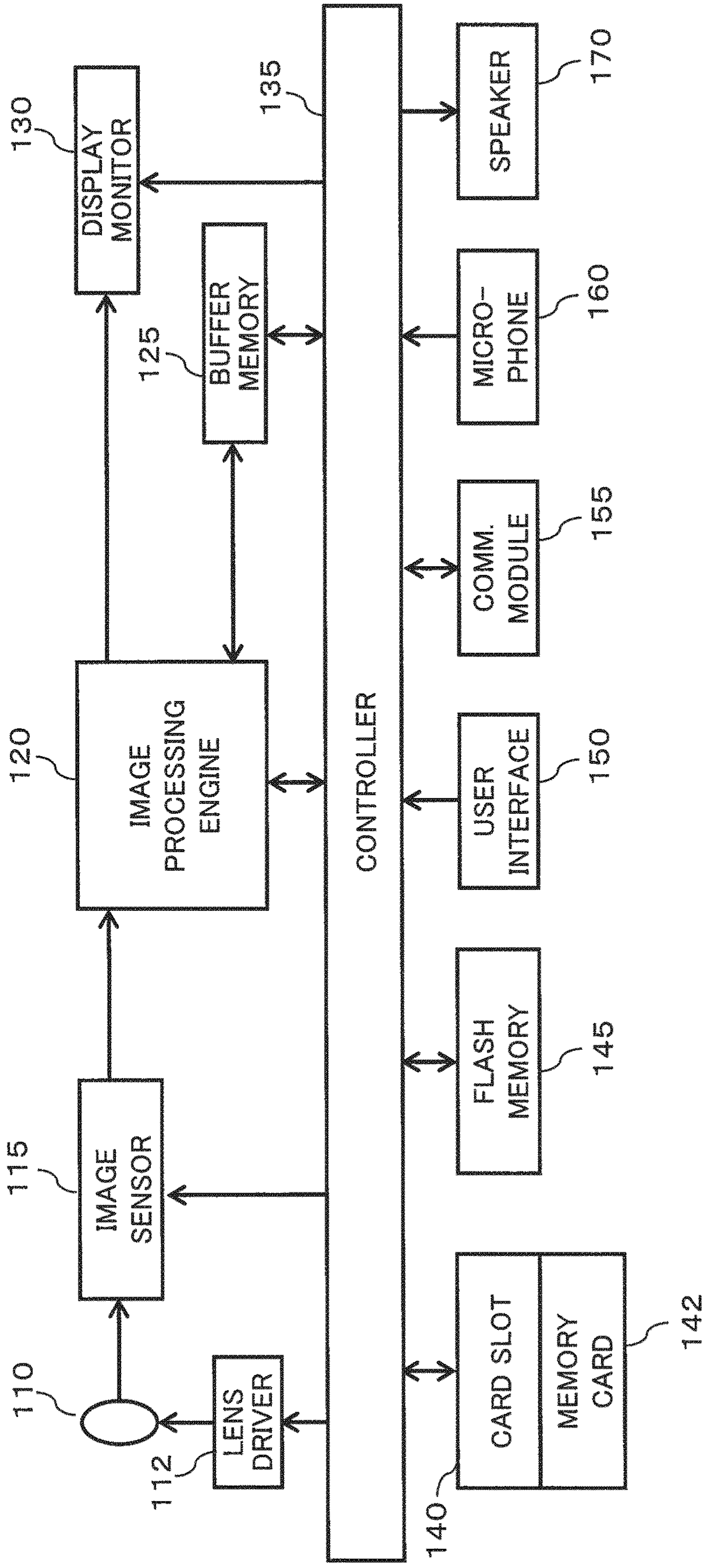
FIG. 2 is a diagram illustrating a configuration of a digital camera in the imaging system.

FIG. 2 is a diagram illustrating the configuration of the digital camera 100 in the present system 10. The digital camera 100 is an example of an imaging apparatus in the present embodiment. The digital camera 100 according to the present embodiment includes an image sensor 115, an image processing engine 120, a display monitor 130, and a controller 135. Further, the digital camera 100 includes a buffer memory 125, a card slot 140, a flash memory 145, a user interface 150, a communication module 155, a microphone 160, and a speaker 170. Furthermore, the digital camera 100 includes an optical system 110 and a lens driver 112, for example.

The optical system 110 includes a focus lens, a zoom lens, an optical image stabilizer (OIS), an aperture diaphragm, a shutter, and the like. The focus lens is a lens for changing a focus state of a subject image formed on the image sensor 115. The zoom lens is a lens for changing magnification of a subject image formed by the optical system. Each of the focus lens and the like includes one lens or more lenses.

The lens driver 112 drives the focus lens and the like in the optical system 110. The lens driver 112 includes a motor, to move the focus lens along the optical axis of the optical system 110 under the control of the controller 135. The configuration for driving the focus lens in the lens driver 112 can be realized by a DC motor, a stepping motor, a servo motor, an ultrasonic motor, or the like.

The image sensor 115 captures a subject image formed via the optical system 110 to generate imaging data. The imaging data constitutes image data indicating an image captured by the image sensor 115. The image sensor 115 generates image data of a new frame at a predetermined frame rate (e.g., 30 frames/second). The generation timing of the imaging data and an electronic shutter operation in the image sensor 115 are controlled by the controller 135. As the image sensor 115, various image sensors such as a CMOS image sensor, a CCD image sensor, or an NMOS image sensor can be used.

The image sensor 115 performs an operation of capturing a still image, an operation of capturing a through image, and the like. The through image is mainly a video, and is displayed on the display monitor 130 in order for the user to determine a composition for capturing a still image. Each of the through image and the still image is an example of a captured image in the present embodiment. The image sensor 115 is an example of an imager in the present embodiment.

The image processing engine 120 performs various processing on the imaging data output from the image sensor 115 to generate image data, and performs various processing on the image data to generate an image to be displayed on the display monitor 130. Examples of various processing include white balance correction, gamma correction, YC conversion processing, electronic zoom processing, compression processing, expansion processing, and the like, but the various processing are not limited thereto. The image processing engine 120 may be configured by a hard-wired electronic circuit, or may be configured by a microcomputer using a program, a processor, or the like.

The display monitor 130 is an example of a display that displays various information. For example, the display monitor 130 displays an image (through image) indicated by image data captured by the image sensor 115 and subjected to image processing by the image processing engine 120. In addition, the display monitor 130 displays a menu screen or the like for the user to perform various settings on the digital camera 100. The display monitor 130 can be configured by a liquid crystal display device or an organic EL device, for example.

The user interface 150 is a general term for hard keys such as operation buttons and operation levers provided on the exterior of the digital camera 100, operable to receive an operation by the user. For example, the user interface 150 includes a release button, a mode dial, and a touch panel. When the user interface 150 receives an operation by the user, the user interface 150 transmits an operation signal corresponding to the user operation to the controller 135.

The controller 135 integrally controls the entire operation of the digital camera 100. The controller 135 includes a CPU and the like, and the CPU executes a program (software) to realize a predetermined function. The controller 135 may include, instead of the CPU, a processor including a dedicated electronic circuit designed to realize a predetermined function. That is, the controller 135 can be realized by various processors such as a CPU, an MPU, a GPU, a DSP, an FPGA, and an ASIC. The controller 135 may include one or more processors. The controller 135 may include one semiconductor chip together with the image processing engine 120 and the like.

The buffer memory 125 is a recording medium that functions as a work memory of the image processing engine 120 and the controller 135. The buffer memory 125 is realized by a dynamic random access memory (DRAM) or the like. The flash memory 145 is a nonvolatile recording medium. Although not illustrated, the controller 135 may include various internal memories, and may incorporate a ROM, for example. The ROM stores various programs to be executed by the controller 135. The controller 135 may incorporate a RAM that functions as a work area of the CPU.

The card slot 140 is a module into which a removable memory card 142 is inserted. The memory card 142 can be connected to the card slot 140 electrically and mechanically. The memory card 142 is an external memory including a recording element such as a flash memory therein. The memory card 142 can store data such as image data generated by the image processing engine 120.

The communication module 155 is a module (circuit) that connects to an external device according to a predetermined communication standard in wired or wireless communication. For example, the predetermined communication standard includes USB, HDMI (registered trademark), IEEE 802.11, Wi-Fi, Bluetooth, and the like. The digital camera 100 can communicate with other devices via the communication module 155.

The microphone 160 includes one or more microphone elements incorporated in the digital camera 100, for example. The microphone 160 outputs a sound signal indicating the collected sound to the controller 135. An external microphone may be used in the digital camera 100. The digital camera 100 may include a connector such as a terminal connected to an external microphone instead of or in addition to the built-in microphone 160.

The speaker 170 includes one or more speaker elements built in the digital camera 100 and outputs sound to the outside of the digital camera 100 under the control of the controller 135, for example. In the digital camera 100, an external speaker, an earphone, or the like may be used. The digital camera 100 may include a connector connected to an external speaker or the like instead of or in addition to the built-in speaker 170.

1.2. Configuration of Information Support Terminal

A configuration of the information support terminal 200 in the present embodiment will be described with reference to FIG. 3.

Figure 3:
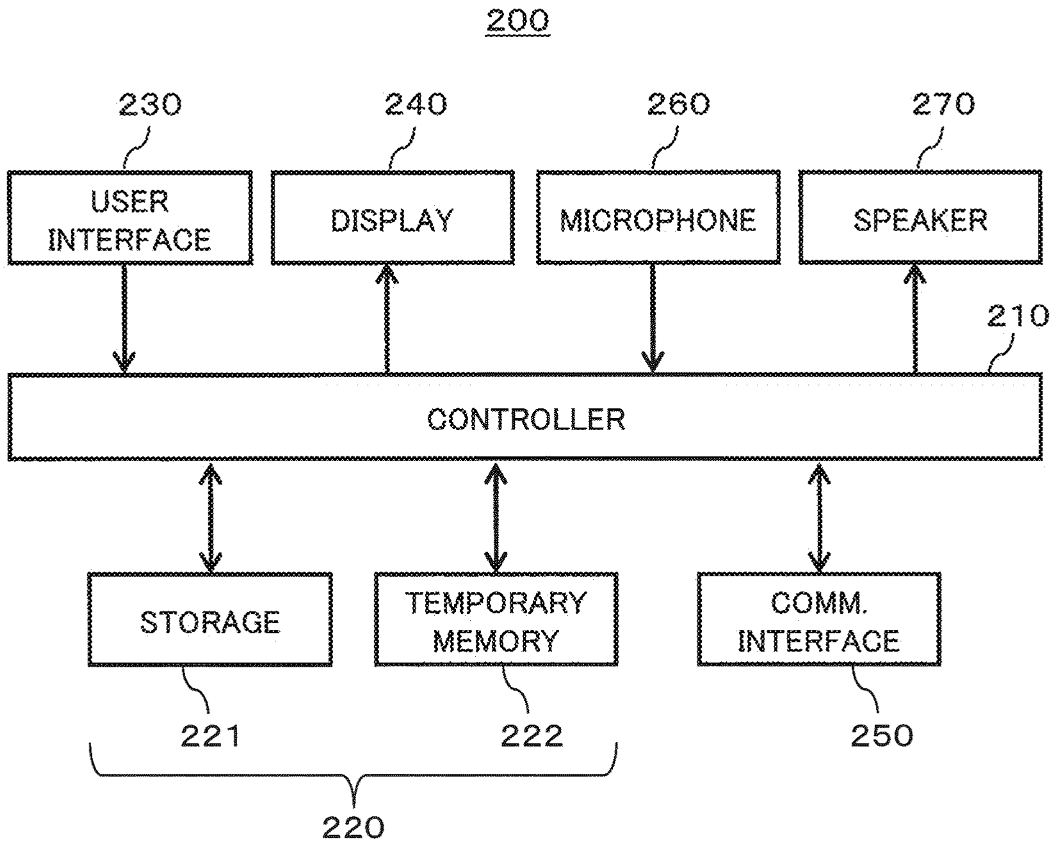
FIG. 3 is a diagram illustrating a configuration of an information support terminal in the imaging system.

FIG. 3 is a diagram illustrating the configuration of the information support terminal 200. The information support terminal 200 is an example of an electronic device including a smartphone, a tablet terminal, a PC, or the like, for example. The information support terminal 200 illustrated in FIG. 3 includes a controller 210, a memory 220, a user interface 230, a display 240, a communication interface 250, a microphone 260, and a speaker 270.

The controller 210 includes a CPU or an MPU that realizes a predetermined function in cooperation with software, for example. The controller 210 controls the overall operation of the information support terminal 200, for example. The controller 210 reads data and programs stored in the memory 220 and performs various calculation processing to realize various functions.

For example, the controller 210 executes a program including a command group for realizing each of the above-described functions. The above program may be provided from a communication network such as the Internet, or may be stored in a portable recording medium. The controller 210 may be a hardware circuit such as a dedicated electronic circuit or a reconfigurable electronic circuit designed to realize each of the above-described functions. The controller 210 may include various semiconductor integrated circuits such as a CPU, an MPU, a GPU, a GPGPU, a TPU, a microcomputer, a DSP, an FPGA, and an ASIC.

The memory 220 is a memory medium that stores programs and data necessary for implementing the functions of the information support terminal 200. As illustrated in FIG. 3, the memory 220 includes a storage 221 and a temporary memory 222.

The storage 221 stores parameters, data, control programs, and the like for realizing a predetermined function. The storage 221 includes an HDD or an SSD, for example. For example, the storage 221 stores the above-described programs, various image data, and the like.

The temporary memory 222 includes a RAM such as a DRAM or an SRAM, to temporarily store (i.e., hold) data, for example. For example, the temporary memory 222 holds image data in the middle of being edited. In addition, the temporary memory 222 may function as a work area of the controller 210, and may be configured by a storage area in an internal memory of the controller 210.

The user interface 230 is a general term for operation members operated by a user. For example, the user interface 230 is a touch panel superimposed on the display 240 to input various touch operations, and is an example of an input interface of the information support terminal 200. The input interface may be a connection software unit that is communicably connected to various external input devices and receives an operation signal. The user interface 230 may be a physical button, a switch, or the like provided in the information support terminal 200, or a keyboard, a mouse, a touch pad, or the like may be used. The user interface 230 may be various GUIs such as virtual buttons and icons, cursors, software keyboards, and objects displayed on the display 240.

The display 240 includes a liquid crystal display or an organic EL display, for example. The display 240 may display various information such as various GUIs for operating the user interface 230 and information input from the user interface 230.

The communication interface 250 is a module (circuit) that connects to an external device according to a predetermined communication standard in wired or wireless communication. For example, the predetermined communication standard includes USB, HDMI, IEEE 802.11, Wi-Fi, Bluetooth, and the like. The communication interface 250 may connect the information support terminal 200 to a communication network such as the Internet. The communication interface 250 is an example of an input interface that receives various information from an external device or a communication network.

The microphone 260 includes one or more microphone elements incorporated in the information support terminal 200, for example. The microphone 260 outputs a sound signal indicating the collected sound to the controller 210. The information support terminal 200 may include a connector such as a terminal connected to an external microphone instead of or in addition to the built-in microphone 260.

The speaker 270 includes one or more speaker elements built in the digital camera 100, and outputs a sound to the outside of the information support terminal 200 under the control of the controller 210, for example. The information support terminal 200 may include a connector connected to an external speaker, an earphone, or the like instead of or in addition to the built-in speaker 270.

The configuration of the information support terminal 200 as described above is an example, and the configuration of the information support terminal 200 is not limited thereto. For example, various display devices such as a projector and a head mounted display may be used as the display 240 of the information support terminal 200. For example, when an external display device is used, the display 240 of the information support terminal 200 may be an output interface circuit such as a video signal conforming to the HDMI standard or the like.

2. Operation

The operation of the present system 10 configured as described above will be described below.

In the present system 10, the information support terminal 200 has various functions for sequentially providing information support to the user in the workflow of video production. A display example of a screen for selecting various functions of the information support terminal 200 is illustrated in FIG. 4.

Figure 4:
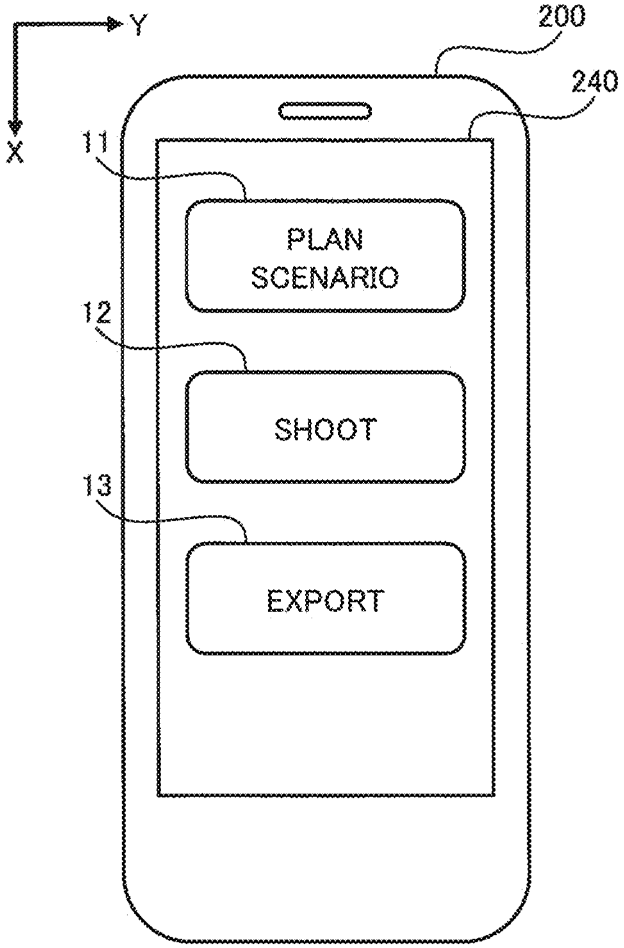
FIG. 4 is a diagram illustrating a display example of a function selection screen in the information support terminal.

The display 240 of the information support terminal 200 displays a scenario planning button 11, a shooting button 12, and an export button 13 on the function selection screen illustrated in FIG. 4. Hereinafter, the longitudinal direction on the screen of the display 240 is defined as an X direction, and the width direction is defined as a Y direction.

The scenario planning button 11 is a virtual button that responds a user operation to execute a function (i.e., a scenario planning function) of performing information support for a process of planning a scenario by the user before shooting a video in the present system 10. The information support terminal 200 of the present system 10 manages various information for each cut such as a shooting section that divides the scenario planned in this way. The cut constitutes a section in a plurality of times of video shooting for a scenario, for example.

For example, the shooting button 12 is a virtual button for executing a function (i.e., a cut shooting function) of supporting video shooting of each cut in a scenario planned by the scenario planning function. The number of times of shooting a video for one cut is not particularly limited to one take, and may be a plurality of takes. In the present embodiment, the information support terminal 200 controls video shooting by the digital camera 100 in the cut shooting function, and manages an shooting result for each cut.

The export button 13 is a virtual button for executing a function (i.e., an export function) of performing pre-processing for external output on a management result of video shooting by the cut shooting function and outputting the result. The pre-processing by the export function provides information support for facilitating a process of editing a video of a plurality of shooting results according to a scenario in the video editing PC 300, for example.

The information support terminal 200 of the present system 10 can provide comprehensive information support from planning of a scenario to pre-processing of video editing when the user sequentially uses the functions of the scenario planning button 11, the shooting button 12, and the export button 13, for example.

In the present system 10, the function selection screen of the information support terminal 200 may further include a delete button for deleting various data in the information support as described above. For example, the information support terminal 200 may collectively delete the video files of the same scenario in response to the user operation of the delete button.

2.1. Scenario Planning Function

The scenario planning function in the information support terminal 200 of the present system 10 will be described with reference to FIGS. 5 to 6.

Figure 5:
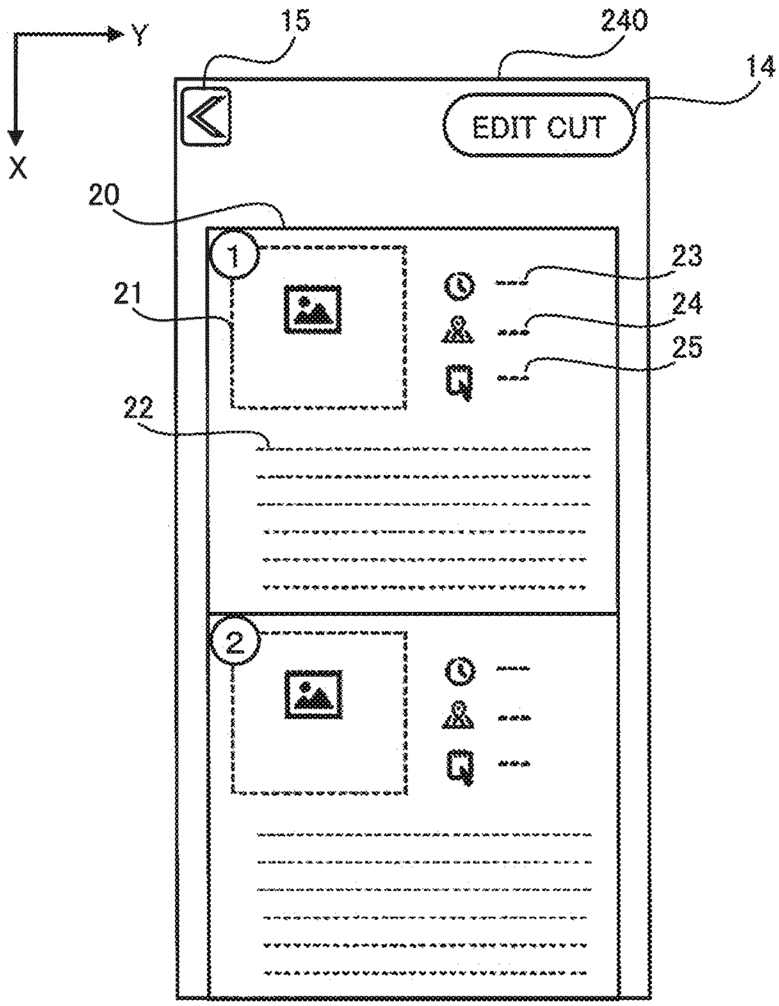
FIG. 5 is a diagram illustrating a display example of a scenario input screen in the information support terminal.

FIG. 5 illustrates a display example of a scenario input screen in the information support terminal 200. When a user operation such as tapping the scenario planning button 11 on the function selection screen of FIG. 4 is input from the user interface 230, the controller 210 of the information support terminal 200 displays a scenario input screen on the display 240 as illustrated in FIG. 5.

The scenario input screen is a screen for the user to input a scenario to the information support terminal 200 in the scenario planning function of the present system 10. As illustrated in FIG. 5 the scenario input screen includes a storyboard input field 20 for each cut, a cut edit button 14, and a return button 15, for example. The controller 210 of the information support terminal 200 causes the user interface 230 to receive various user operations related to the scenario input screen displayed on the display 240.

In the information support terminal 200, the storyboard input field 20 receives a user input of information indicating a storyboard such as an outline of a scenario concept for each cut constituting a scenario. As illustrated in FIG. 5 the storyboard input field 20 for each cut includes a composition field 21, a script field 22, an shooting time field 23, an shooting location field 24, and a memo field 25, for example.

The composition field 21 receives an input of image information indicating a composition or the like in the video shooting of the cut. The input of the image information may be drawing by user operation or designation of image data. The script field 22 receives a text input such as a script divided for the cut in the scenario.

The shooting time field 23 receives a numerical value input indicating a rough time length for shooting the video of the cut. The shooting location field 24 receives an input of information indicating a location where the video of the cut is shot. The input of the shooting location may be text input, or data search or the like may be appropriately used. The memo field 25 receives an input of various information desired by the user, such as shooting equipment, with respect to the video shooting of the cut by text input, for example.

In the example of FIG. 5, the display 240 displays a storyboard input field 20 for two cuts. The controller 210 acquires the storyboard information for each cut according to the user input to the various fields 21 to 25 in the storyboard input field 20 for each cut in the scenario. On the scenario input screen of the information support terminal 200, the storyboard input field 20 of the cut displayed on the display 240 can be changed according to a swipe operation for scrolling in the X direction in which the storyboard input field 20 for each cut is arranged, for example.

The cut edit button 14 switches on/off of a state in which various user operations such as addition, deletion, and order change of cuts included in the scenario can be input. For example, by a touch operation in the on state of the cut edit button 14, the user can arrange the storyboard input fields 20 for a desired number of cuts in order in time series in the scenario.

The return button 15 responds a user operation to return the screen transition in the information support terminal 200 by one screen. For example, the controller 210 causes the display 240 to transition to the function selection screen (FIG. 4) in response to the user operation of the return button 15 on the scenario input screen (FIG. 5). As an output of such a scenario planning function, the controller 210 according to the present embodiment generates cut allocation data including storyboard information of each cut and stores the cut allocation data in the memory 220. The cut allocation data at the end of such a scenario planning function is illustrated in FIG. 6.

For example, as illustrated in FIG. 6, cut allocation data D1 manages "script", "composition", "shooting time", "shooting location", "shooting completion flag", and "video metadata list" in association with each other for each "cut number". The cut allocation data D1 is an example of management information in the present embodiment.

For example, the controller 210 of the information support terminal 200 assigns cut numbers indicating cut identification information in the cut allocation data D1 in ascending order in the storyboard input field 20 for each cut arranged on the scenario input screen. When the cut order is changed, the controller 210 re-assigns the cut numbers according to the changed order. For each cut, the controller 210 records each piece of information input to the script field 22, the composition field 21, the shooting time field 23, the shooting location field 24, and the memo field 25 of the storyboard input field 20 in "script", "composition", "shooting time", "shooting location", and "memo" of the cut allocation data D1, respectively.

In the cut allocation data D1, the "shooting completion flag" manages whether the cut is in a state of imaging completion or in a state of imaging incompletion by ON/OFF. At the end of the scenario planning function, the shooting completion flag is set to OFF for all cuts as an initial setting.

The "video metadata list" is a list for storing metadata of a video shot in association with the cut. At the end of the scenario planning function, the video metadata list is set to an empty value as an initial setting.

As described above, according to the scenario planning function in the information support terminal 200 of the present system 10, by generating the cut allocation data D1 from the user input on the scenario input screen, the information support of the process of planning the scenario of the video work desired by the user for each cut can be performed.

The scenario planning function of the information support terminal 200 is not particularly limited to the above. For example, the information support terminal 200 may receive a user instruction for outputting data of the storyboard information of the scenario input on the scenario input screen using a data format (e.g., PDF format) that can be shared by another device, and perform the data output.

2.2. Cut Shooting Function

An outline of an operation of the cut shooting function in the information support terminal 200 of the present system 10 will be described with reference to FIG. 7.

Figure 7:
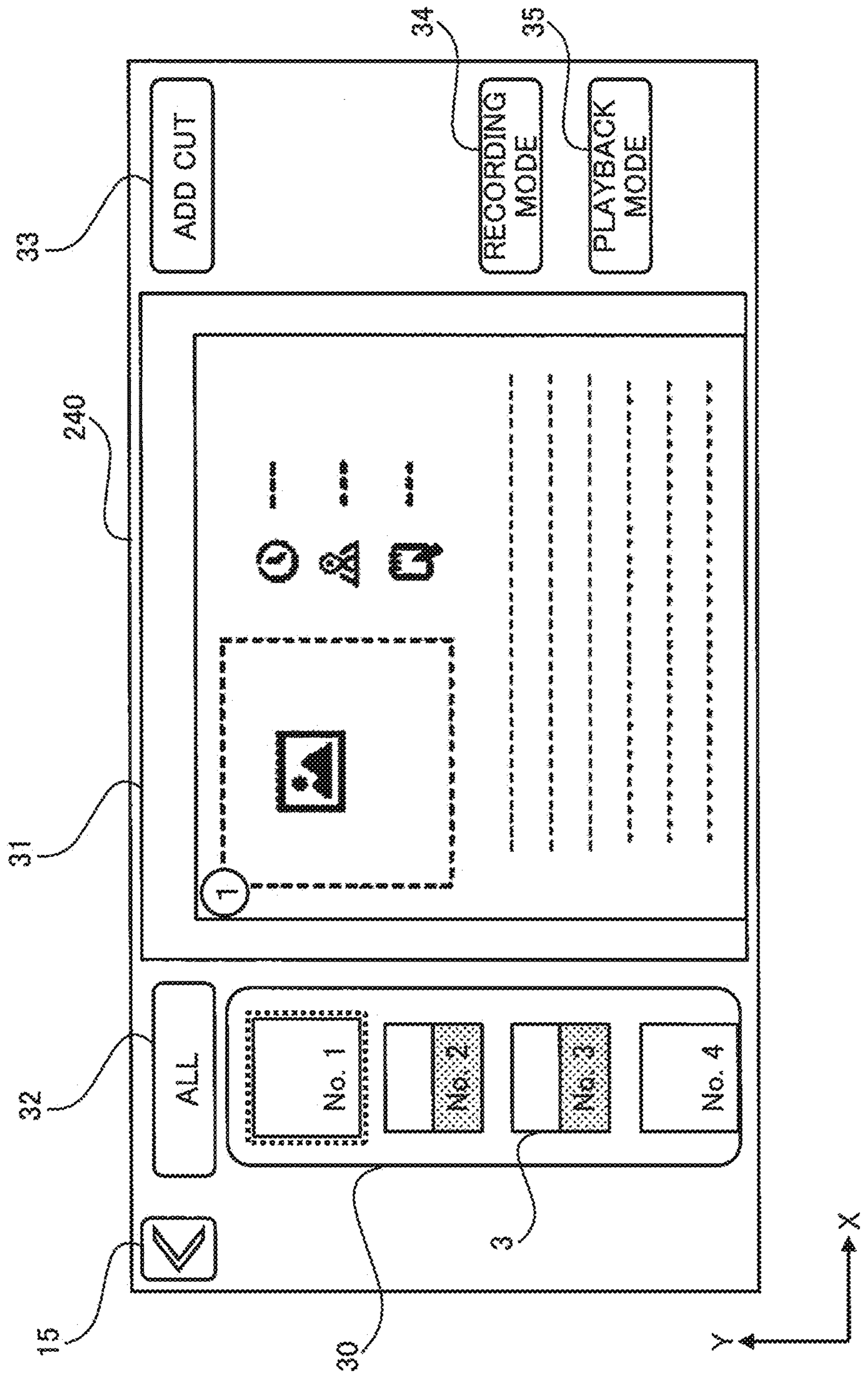
FIG. 7 is a diagram illustrating a display example of a cut selection screen in the information support terminal.

FIG. 7 illustrates a display example of a cut selection screen on the information support terminal 200. The cut selection screen is a screen for selecting a cut desired by the user from cuts provided in the scenario planning function in the cut shooting function of the present system 10, for example. The cut selection screen is an example of a selection screen in the information support terminal 200 according to the present embodiment.

As illustrated in FIG. 7, the cut selection screen includes a cut list 30, a storyboard display field 31, a filter button 32, a cut addition button 33, a recording mode button 34, a playback mode button 35, and a return button 15, for example. The cut list 30 is a list listing various cuts as options selectable by the user. The storyboard display field 31 is a display field for displaying storyboard information on the selected cut. Details of the cut selection screen will be described later.

In the cut shooting function of the present system 10, the information support terminal 200 provides information support that facilitates the user to comprehensively carry out video shooting of each cut with checking various cuts, by using the cut selection screen illustrated in FIG. 7, for example. The user may perform video shooting in an order different from the cut order in the scenario, or may perform video shooting of a plurality of takes for video shooting of one cut.

Therefore, the information support terminal 200 of the present system 10 receives the rating by the user of the video for the selected cut at shooting the video of each take, manages whether or not the shooting of the cut is completed, and visualizes the progress status of the video shooting for each cut in the cut list 30 for the user. Details of the operation of the present system 10 will be described below.

2.2.1. Overall Operation of Cut Shooting Function

The overall operation of the cut shooting function in the present system 10 will be described with reference to FIGS. 7 to 9.

Figure 8:
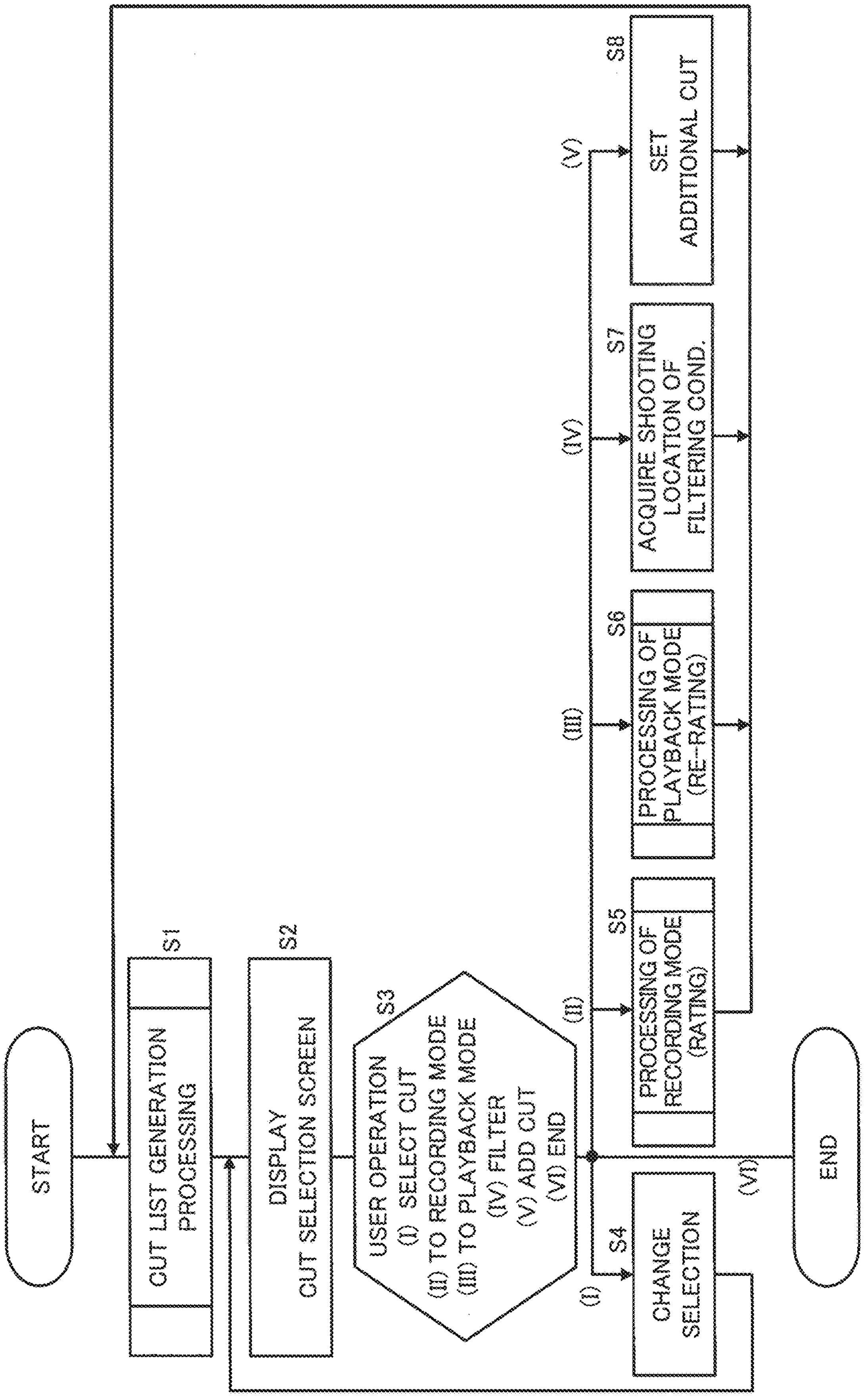
FIG. 8 is a flowchart illustrating an operation of a cut shooting function in the imaging system.

FIG. 8 is a flowchart illustrating an operation of the cut shooting function in the present system 10. Each processing illustrated in the flowchart of FIG. 8 is executed by the controller 210 of the information support terminal 200, for example. For example, the processing of this flow is started when the shooting button 12 on the function selection screen (FIG. 4) is operated in a state where the cut allocation data D1 by the scenario planning function is stored in the memory 220 and the communication connection with the digital camera 100 is established in the communication interface 250.

First, the controller 210 of the information support terminal 200 generates the cut list 30 to be displayed on the cut selection screen (FIG. 7) on the basis of the cut allocation data D1 (S1). For example, the cut list generation processing (S1) is repeatedly executed in the present system 10 in accordance with the progress status of video shooting and various operations of the user during execution of the cut shooting function, and sequentially updates the cut list 30. Details of the processing of step S1 will be described later.

Next, the controller 210 causes the display 240 to display a cut selection screen on the basis of the generated cut list 30 and the cut allocation data D1 as illustrated in FIG. 7, for example (S2).

As illustrated in FIG. 7 the cut list 30 on the cut selection screen includes a plurality of cut icons 3. Each cut icon 3 indicates an individual cut as an option, for example. The selected cut icon 3 is set to the cut number "1" in the initial state, for example.

For example, the controller 210 controls the display 240 to highlight the cut icon 3 indicating the selected cut (S2). For example, the highlighting of the selected cut icon 3 is a larger display size than that of the other cut icons 3, a frame enclosure of a highlight color, and the like. Referring to the cut allocation data D1, the controller 210 causes the storyboard display field 31 to display the storyboard information about the cut indicated by the selected cut icon 3 (S2).

In the example of FIG. 7, the cut of the cut numbers "1" and "3" is in a state where imaging is not completed, and the cut of the cut numbers "2" and "4" is in a state where imaging is completed. In the cut list 30 according to the present embodiment, the cut icon 3 has a display attribute for identifying a state of imaging completion and a state of imaging incomplete. For example, such a display attribute is set so as to highlight the display mode in which the display mode of the shooting completion state is the imaging incomplete state.

The controller 210 receives various user operations with the user interface 230 such as a touch panel while the display 240 displays the cut selection screen as illustrated in FIG. 7, for example (S3). The target user operation in step S3 includes (I) a cut selection operation, (II) a transition operation to the recording mode, (III) a transition operation to the playback mode, (IV) a filtering operation, (V) a cut addition operation, and (VI) an end operation.

The cut selection operation ((I) in S3) is a user operation of changing the selected cut, and is an operation of tapping the cut icon 3 other than the selected cut icon 3 in the cut list 30 displayed on the cut selection screen, for example. The cut selection operation is not limited thereto, and for example, a swipe operation in the storyboard display field 31 may be input as a cut selection operation of changing the selected cut to an adjacent cut.

When the cut selecting operation is input ((I) in S3), the controller 210 changes the selected cut icon 3 according to the input cut selecting operation (S4), and performs the processing in and after step S2 again. As a result, on the cut selection screen, the selected cut icon 3 is changed, and the storyboard display field 31 is displayed for a new selected cut (S2).

The transition operation to the recording mode ((II) in S3) is a user operation for shifting to the recording mode, which is an operation mode for shooting a video related to the selected cut, and is a tap operation on the recording mode button 34, for example. Additionally or alternatively, the transition operation may be a swipe operation in a predetermined one of the +X directions of the cut selection screen. The recording mode button 34 may be omitted.

When the transition operation to the recording mode is input ((II) in S3), the controller 210 executes, as the recording mode, various processing for shooting a video of one take in association with the selected cut (S5). A display example in step S5 is illustrated in FIG. 9.

Figure 9:
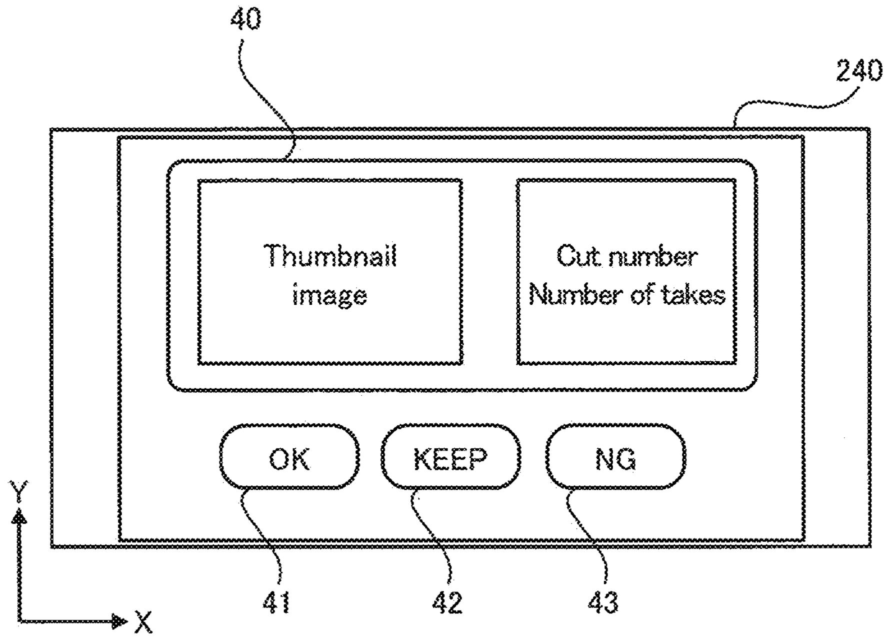
FIG. 9 is a diagram illustrating a display example of a rating screen in the information support terminal.

FIG. 9 illustrates a display example of a rating screen in the information support terminal 200. The rating screen is a screen for prompting the user to perform a rating for determining the rating of the video of the imaged take. The rating screen is an example of a rating screen in the information support terminal 200 according to the present embodiment.

As illustrated in FIG. 9 the rating screen includes an information display field 40 for a shot video, an OK button 41, a KEEP button 42, and an NG button 43 as rating options, for example. The information display field 40 displays information related to the video of the shot take, and includes a thumbnail image of the video of the take, a cut number associated with the take, and the number of takes, for example.

The OK button 41 indicates a rating "OK" indicating that the user has determined to want to adopt the take for the corresponding cut, for example. The KEEP button 42 indicates a rating "KEEP" on which it is difficult for the user to determine whether or not to adopt the take, for example. The NG button 43 indicates a rating "NG (No Good)" in which the user has determined that it is clear that the take is not adopted, for example. In the present embodiment, the rating "NG" is an example of a first rating, and the ratings "OK" and "KEEP" are examples of a second rating.

In the recording mode processing (S5) according to the present embodiment, every time video shooting of one take is performed the rating screen of FIG. 9 is displayed to acquire rating information indicating a rating of the user of the take, for example. On the basis of the rating result of the recording mode processing (S5), the controller 210 performs the cut list generation processing (S1) again as illustrated in FIG. 8 to update the cut list 30. Details of the processing of step S5 will be described later.

The transition operation to the playback mode ((III) in S3) is a user operation for shifting to the playback mode, which is an operation mode for reproducing and displaying a video shot with respect to the selected cut, and is an operation of the playback mode button 35, for example. Additionally or alternatively, the transition operation to the playback mode may be a swipe operation in a direction opposite to the transition operation to the recording mode among the +X directions of the cut selection screen. The playback mode button 35 may be omitted.

When the transition operation to the playback mode is input ((III) in S3), the controller 210 executes processing of reproducing videos of various takes related to the selected cut as the playback mode (S6). In a playback mode processing (S6) in the present embodiment, re-rating for changing the rating on the video of each take can be executed. On the basis of the re-rating result of the playback mode processing (S6), the controller 210 performs the cut list generation processing (S1) again to update the cut list 30. Details of the processing of step S6 will be described later.

The filtering operation ((IV) in S3) is a user operation for narrowing down the cuts to be displayed in the cut list 30, and is an operation of the filter button 32, for example. When a filtering operation is input ((IV) in S3), the controller 210 acquires a condition for filtering cuts to be displayed in accordance with user's selection (S7).

The information support terminal 200 according to the present embodiment uses, as a filtering condition for the cut list 30, an shooting location in the illustrated storyboard information of each cut. The controller 210 performs the cut list generation processing (S1) again on the basis of the shooting location acquired as the filtering condition. In this way, the cut list 30 is updated so as to be limited to the cut icon 3 corresponding to the shooting location of the filtering condition (details will be described later).

The cut adding operation ((V) in S3) is a user operation of adding a new cut in addition to the existing cut in the cut list 30, and is an operation of the cut addition button 33, for example. When the cut adding operation is input ((V) in S3), the controller 210 sets various information on the additional cut (S8) and performs the cut list generation processing (S1) again (details will be described later).

The end operation ((VI) in S3) is a user operation for ending the cut shooting function, and is an operation of the return button 15 on the cut selection screen (FIG. 7), for example. For example, when an end operation is input ((VI) in S3), the controller 210 causes the display 240 to transition from the cut selection screen to the function selection screen (FIG. 4) and ends the processing illustrated in this flow.

According to the above processing, the user of the present system 10 can perform video shooting of a desired cut (S5) or perform playback display (S6) with checking various cuts on the cut selection screen (FIG. 7) in the cut shooting function of the information support terminal 200 (S4). In this way, the user can easily manage the video shooting of the plurality of cuts in the scenario.

On the cut selection screen according to the present embodiment, each of the cut icons 3 is identified and displayed depending on whether or not the imaging is completed, and thus, it is possible to suppress a situation that a cut is forgotten by a user to shoot. As the identification display of whether or not imaging of each cut is completed is performed so as to reflect the rating of the video of each take by the user, it can be facilitated to ensure the video quality according to the intention of the user. Such rating is performed every time a take is shot (S5), and re-rating can be performed in the playback mode (S6). As a result, it is possible to easily realize quality management of video shooting according to the intention of the user.

The cut selection screen (FIG. 7) according to the present embodiment is not limited to the update of the cut list 30 according to the rating/re-rating of cuts as described above (S5, S6, S1), and can also be updated by filtering or adding cuts to the display target (S7, S8, S1). As a result, the user can efficiently use a desired cut on the cut selection screen at the site of video shooting, and can easily use the cut shooting function of the present system 10, for example.

In the cut shooting function according to the present embodiment, communication connection with the digital camera 100 may be managed, and for example, a button for managing communication connection may be provided on the cut selection screen. When the communication connection with the digital camera 100 is not established, the controller 210 may disable the operation to transit to the recording mode ((II) in S3).

2.2.2. Cut List Generation Processing

Details of the cut list generation processing in step S1 of FIG. 8 will be described with reference to FIGS. 10 to 12.

Figure 10:
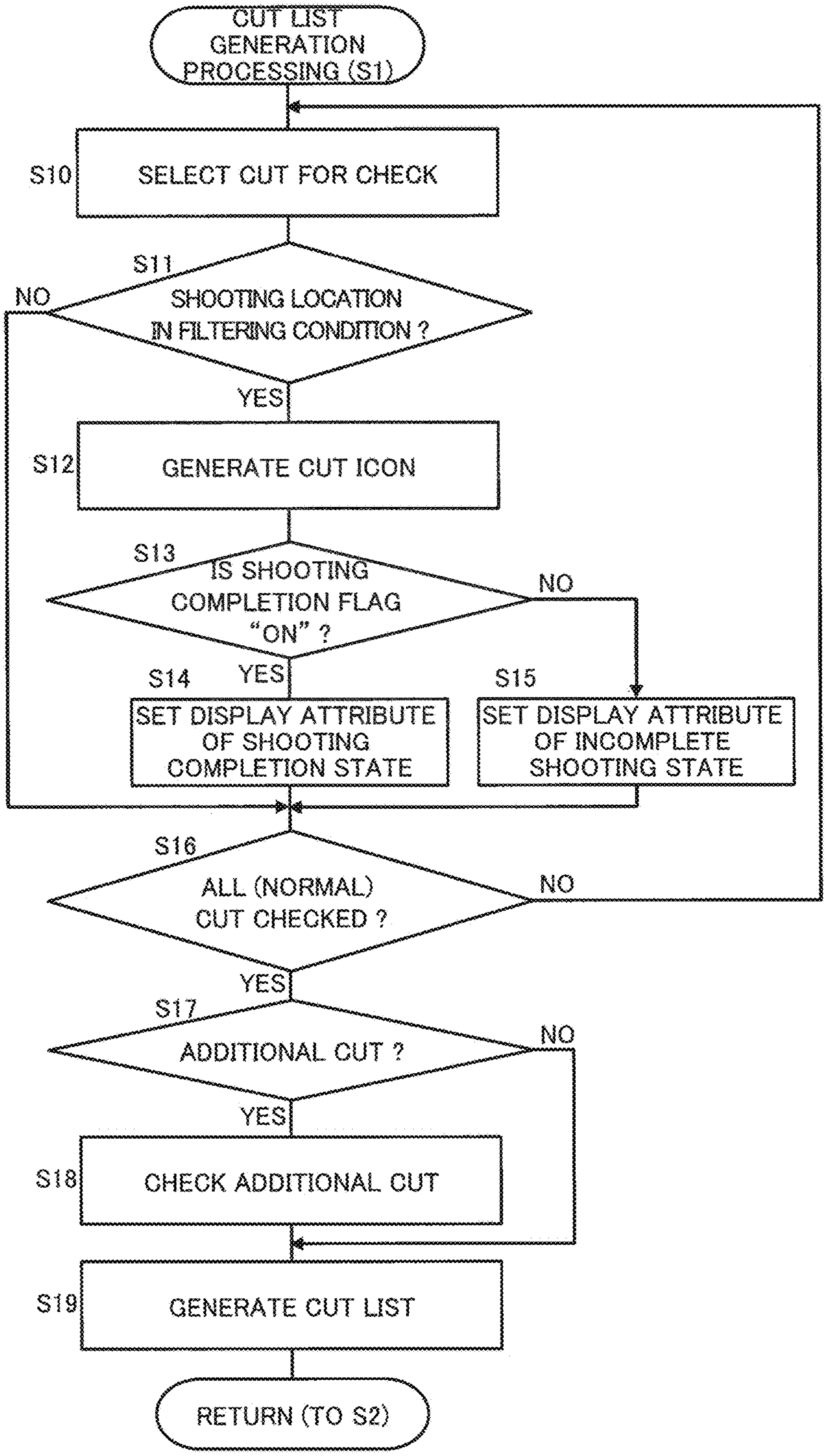
FIG. 10 is a flowchart illustrating cut list generation processing in the imaging system.

FIG. 10 is a flowchart illustrating the cut list generation processing (S1) in the present system 10. The processing illustrated in the flow of FIG. 10 is started in response to the operation of the shooting button 12 on the function selection screen (FIG. 4), for example. Alternatively, the processing of this flow is started after the execution of steps S5 to S8 in response to a predetermined user operation ((II) to (V) in S3 of FIG. 8) on the cut selection screen (FIG. 7).

First, the controller 210 of the information support terminal 200 selects one cut from among all cuts included in the cut allocation data D1 (FIG. 6) as a check target for such as determination whether to provide the cut in the cut list 30 (S10). The selection in step S10 is performed in ascending order for the cut numbers in the cut allocation data D1, for example.

Next, the controller 210 determines whether the shooting location of the cut to be checked corresponds to the filtering condition on the basis of the shooting location of the cut to be checked in the cut allocation data D1, for example (S11). Such filtering will be described with reference to FIG. 11.

Figure 11:
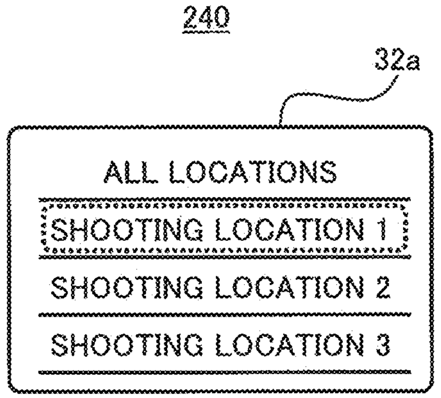
FIG. 11 is a diagram for explaining filtering of a cut list.
Figure 12:
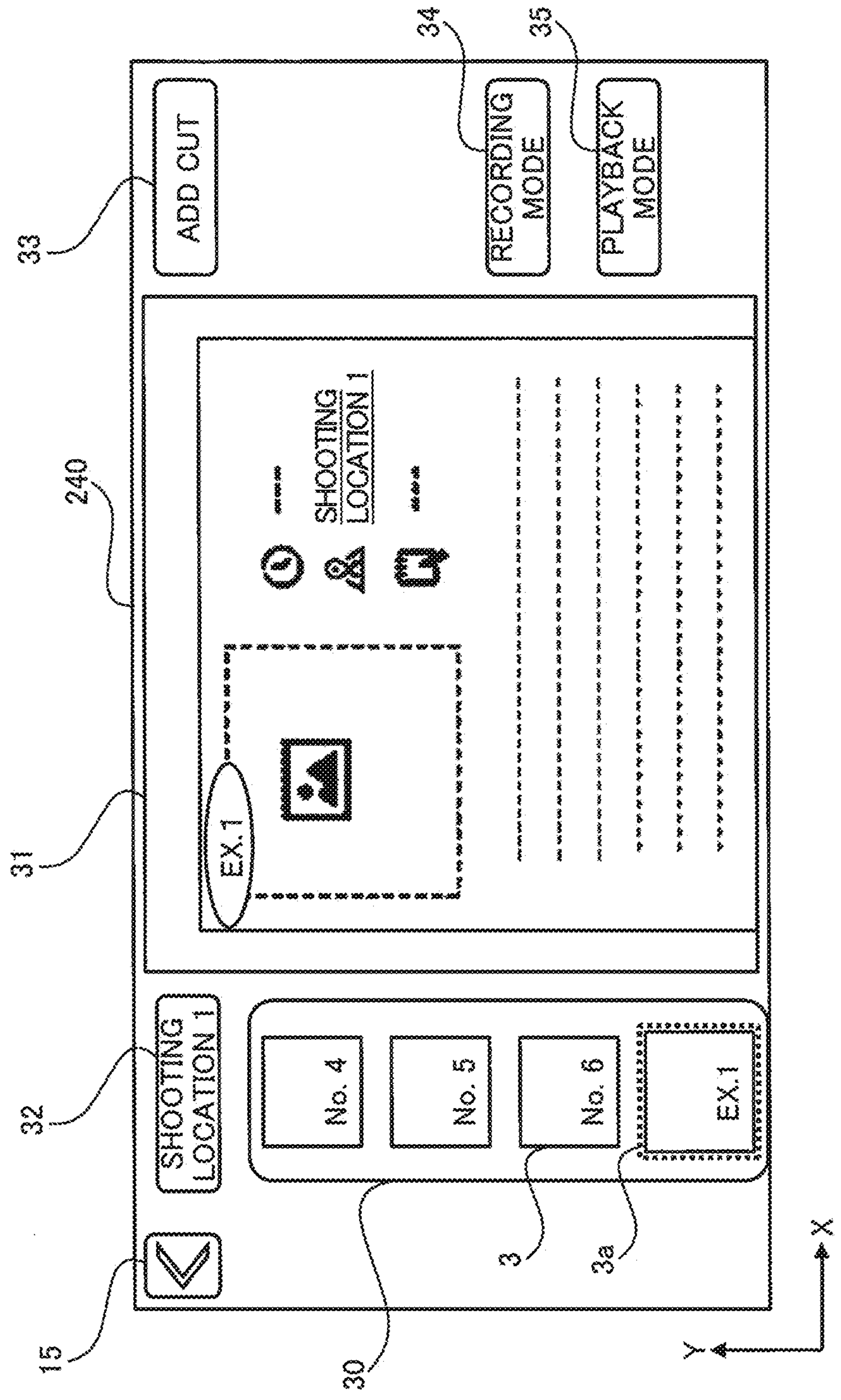
FIG. 12 is a diagram illustrating a cut list in a case with an additional cut.

FIG. 11 illustrates a display example of a selection dialog 32*a* in step S7 of FIG. 8. For example, when the user taps the filter button 32 on the cut selection screen of FIG. 7 ((IV) in S3), the display 240 displays the selection dialog 32*a* in step S7. The selection dialog 32*a* includes options of filtering conditions such as "all locations", "shooting location 1", and "shooting location 2".

For example, the filtering condition is set to "all locations" as an initial state (see the filter button 32 of FIG. 7), and in this case, the determination in step S11 is "YES". When the user's filtering operation ((IV) in S3 of FIG. 8) selects a specific shooting location as the filtering condition in (S7), the controller 210 determines whether the shooting location of the cut to be checked matches the specific shooting location (S11).

In step S7 of FIG. 8, the controller 210 displays the selection dialog 32*a* (FIG. 11) on the basis of various shooting locations included in the cut allocation data D1, and receives a user operation of selecting any option on the selection dialog 32*a*. For example, when the user taps any option on the selection dialog 32*a*, the controller 210 acquires an shooting location of the option as a filtering condition (S7), and performs the determination of step S11 of the cut list generation processing (S1) on the basis of the filtering condition.

Referring back to FIG. 10, when the shooting location to be checked does not correspond to the filtering condition (NO in S11), the controller 210 proceeds to step S16 without performing steps S12 to S15 such as generation of cut icon 3. In this way, a cut different from the shooting location of the filtering condition is excluded from the display target in the cut list 30.

When the shooting location to be checked corresponds to the filtering condition (YES in S11), the cut is provided as the display target of the cut list 30. In this case, the controller 210 generates the cut icon 3 corresponding to the cut, for example (S12).

Next, the controller 210 determines whether or not the shooting completion flag of the cut that has generated the cut icon 3 is ON on the basis of the cut allocation data D1, for example (S13). For example, the shooting completion flag is turned on when the video associated with the cut to be checked includes a video rated as "OK" or "KEEP", and is turned off otherwise. The determination in step S13 may be made by referring to the rating of each video associated with the cut to be checked instead of using the shooting completion flag.

When the shooting completion flag of the cut is ON (YES in S13), the controller 210 sets the display attribute of the shooting completion state in the corresponding cut icon 3 (S14).

On the other hand, when the shooting completion flag of the cut is not ON but OFF (NO in S13), the controller 210 sets the display attribute of the image shooting incomplete state to the corresponding cut icon 3 (S15).

The controller 210 determines whether all the cuts to which the cut numbers are assigned are checked on the basis of the cut allocation data D1, for example (S16). For example, the determination in step S16 is performed within a range of cut included in the cut allocation data D1 (hereinafter referred to as "normal cut") from the time of planning the scenario separately from the additional cut.

When all the normal cuts have not been checked (NO in S16), the controller 210 performs the processing in and after step S11 again for the unchecked normal cut. Thus, the display target of the cut list 30 is sequentially checked for all the normal cuts (YES in S16).

When all the normal cuts are checked (YES in S16), the controller 210 determines whether or not an additional cut is present, for example (S17). In step S8 of FIG. 8, the additional cut is set so as to be assigned an additional cut number which is identification information different from the cut number in the cut allocation data D1, for example (see FIG. 12).

When no additional cut is present (NO in S17), the controller 210 generates the cut list 30 on the basis of the check result of the normal cut (S11 to S16) without particularly performing the processing of step S18 (S19). For example, the cut icons 3 to be displayed in the cut list 30 are arranged in ascending order of cut numbers.

On the other hand, when an additional cut is present (YES in S17), the controller 210 performs various processes of checking the display target of the cut list 30 for the additional cut similarly to the normal cut (S18). The processing of step S18 is performed similarly to the processing of steps S11 to S16 with the range of the additional cut as a check target instead of the normal cut. In this case, based on the check results of the normal cut and the additional cut (S11 to S16, S18), the controller 210 generates the cut list 30 (S19).

When the cut list 30 is generated in this manner (S19), the controller 210 ends the processing of step S1 of FIG. 8 and proceeds to step S2, for example.

According to the cut list generation processing (S1) described above, the information support terminal 200 of the present system 10 generates the cut list 30 listing cuts included in the scenario on the basis of the cut allocation data D1 so as to identify and display whether or not the imaging is in a completion state (S14, S15). Such identification display of the cut list 30 is dynamically updated according to the changed rating when the rating for each take in each cut changes (S5, S6 of FIG. 8). This makes it easy for the user to check the progress status of the video shooting of the plurality of cuts.

In the present system 10, the cut list 30 can be narrowed down using the shooting location as the filtering condition (see S7 of FIGS. 8 and S11 of FIG. 10). As a result, the user can use the cut selection screen by selecting the shooting location at the site as the filtering condition to narrow down the cut to be shot at the site, for example. In this way, the present system 10 can facilitate to suppress for the user to forget to shoot a video for a cut at the site.

In the present system 10, the cut list 30 can also be updated to include additional cuts (see S8 of FIGS. 8 and S17 to S18 of FIG. 10). The cut list 30 in a case with an additional cut is illustrated in FIG. 12.

For example, when the user performs a cut adding operation ((V) in S3 of FIG. 8), the controller 210 sets an additional cut (S8), proceeds to YES in step S17 in the subsequent cut list generation processing (S1), and checks the additional cut (S18). Thus, as illustrated in FIG. 12, the cut list 30 is updated to include the cut icon 3*a* for the additional cut, for example.

With such an additional cut of the present system 10, the user can immediately add the cut at the site, for example at the shooting location, without particularly re-editing the scenario. For example, in step S1 after step S8, the cut icon 3*a* for the additional cut is arranged at the end of the cut list 30 as illustrated in FIG. 12. In a case with a plurality of additional cuts, the additional cuts are arranged in ascending order of the additional cut numbers, for example.

In step S8 of FIG. 8, the controller 210 automatically sets the shooting location in the illustrated storyboard information of the additional cut according to the filtering condition, for example. Alternatively, the shooting location of the additional cut may be set by a user input. By setting the shooting location of the additional cut, the additional cut can also be subjected to the filtering (S7) similarly to the normal cut. For example, the storyboard information of the additional cut is set to an empty value except for the shooting location. As the composition of the storyboard information, a predetermined image indicating additional cut may be used. The additional cut may be deleted by a predetermined user operation, and for example, the predetermined user operation may be a long press operation of the cut icon 3*a* for the additional cut.

2.2.3. Recording Mode

Details of the recording mode processing in step S5 of FIG. 8 will be described with reference to FIGS. 13 to 15.

Figure 13:
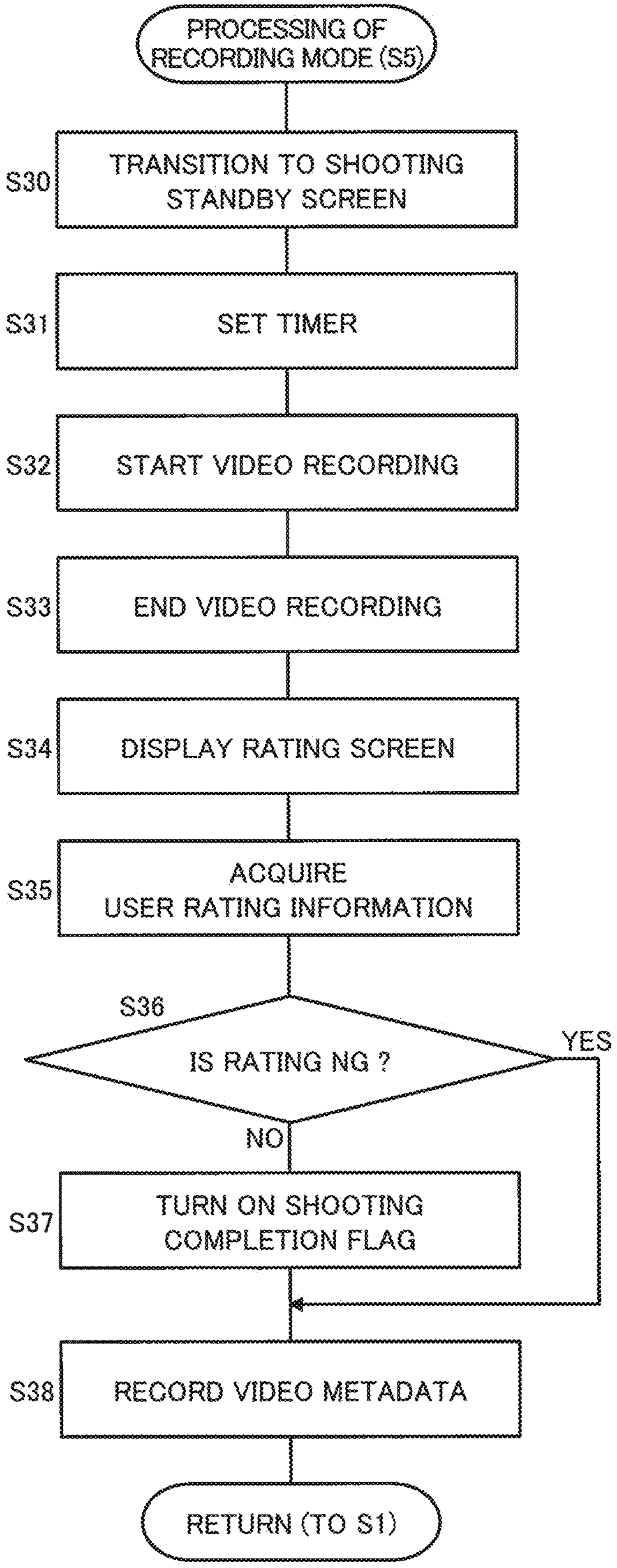
FIG. 13 is a flowchart illustrating recording mode processing in the imaging system.

FIG. 13 is a flowchart illustrating recording mode processing (S5) in the present system 10. The processing illustrated in the flow of FIG. 13 is started when a transition operation to the recording mode is input on the cut selection screen of FIG. 7, for example ((II) in S3).

Figures 14A, 14B, 14C, 14D:
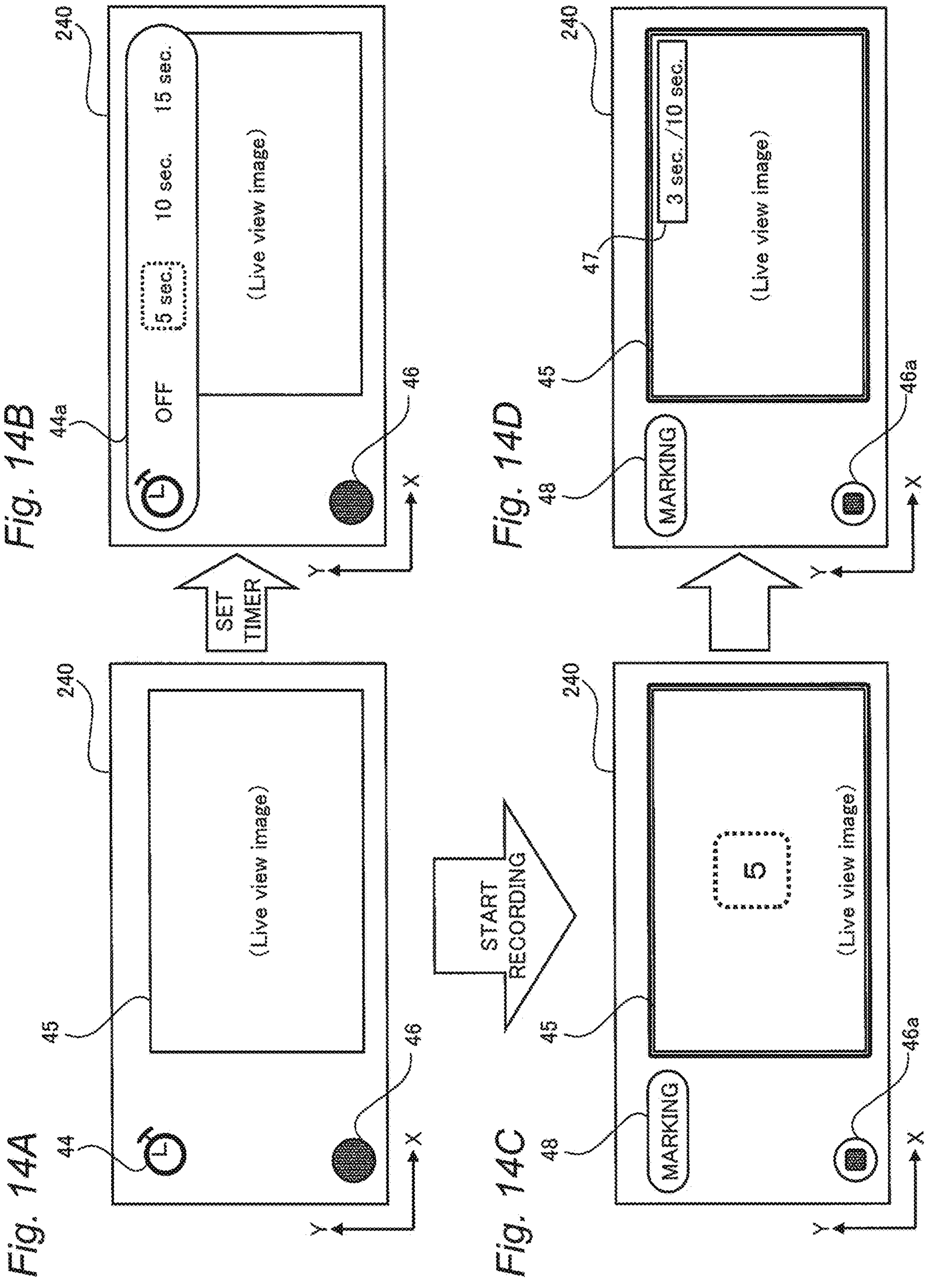
FIGS. 14A to 14D are diagrams illustrating a display example in a recording mode of the information support terminal.

First, the controller 210 of the information support terminal 200 shifts to the recording mode and causes the display 240 to transition to a screen for waiting for video shooting (S30). FIG. 14A illustrates a display example of the information support terminal 200 in step S30.

As illustrated in FIG. 14A, the recording standby screen in step S30 includes a timer button 44, a live view image 45, and a recording button 46, for example. The timer button 44 receives a user operation for setting a timer period for performing timing at the start of imaging, for example. The recording button 46 receives a user operation for starting shooting and recording of a video.

In the present system 10, when shifting to the recording mode, the controller 210 of the information support terminal 200 requests the digital camera 100 to transmit the live view image 45 via the communication interface 250, for example (S30). For example, in the recording mode, the controller 210 sequentially receives the image data of the live view image 45 from the digital camera 100 via the communication interface 250, and displays the live view image 45. For example, the controller 210 receives audio data of a sound collection result of the microphone 160 from the digital camera 100 in a timely manner.

The controller 210 sets a timer period in accordance with a user operation of the timer button 44, for example (S31). FIG. 14B illustrates a display example of the information support terminal 200 in step S31. The setting of the timer period may be performed for each take or may be uniform for each cut.

FIG. 14B illustrates a timer selection field 44*a* displayed in response to the operation of the timer button 44 on the imaging standby screen of FIG. 14A. FIG. 14B illustrates an example in which the timer period is set to "5 seconds" in the timer selection field 44*a*. For example, the timer selection field 44*a* includes options indicating numerical values of the timer period "OFF" and "5 seconds" corresponding to the timer period of 0 seconds. In step S31, when receiving the user operation in the timer selection field 44*a* in the user interface 230, the controller 210 sets the timer period according to the user operation, and returns the display 240 from FIG. 14B to FIG. 14A.

In response to the user operation on the recording button 46, the controller 210 performs various types of control to start shooting and recording of the video of one take associated with the selected cut (S32). For example, in step S32, the controller 210 instructs the digital camera 100 to start shooting and recording of a video via the communication interface 250. A display example of the information support terminal 200 in step S32 is illustrated in FIGS. 14C and 14D.

FIG. 14C illustrates a vide shooting screen when the recording button 46 is operated when the timer period is set as in the example of FIG. 14B. FIG. 14D illustrates a vide shooting screen after the timer period from FIG. 14C. At the time of operation of the recording button 46 (S32), the controller 210 performs a countdown of the lapse of time by the set timer period, and superimposes and displays the time on the live view image, for example. In the present example, the video recording is performed in a period including such a timer period. On the other hand, when the timer period is set to "OFF", the controller 210 does not particularly perform the countdown display as illustrated in FIG. 14C in step S32, and causes the display 240 to transition to a vide shooting screen as illustrated in FIG. 14A to FIG. 14D, for example.

As illustrated in FIGS. 14C and 14D, the vide shooting screen in step S32 includes the live view image 45, a time display field 47, a recording stop button 46*a*, and a marking button 48, for example. For example, highlighting such as frame display indicating that recording is being performed is performed on the live view image 45 on the vide shooting screen. For example, the time display field 47 compares and displays the shooting time of the selected cut in the cut allocation data D1 with the elapsed time from the start of imaging of the video of the take.

In step S32, the controller 210 controls the display 240 to switch the display from the imaging standby screen (FIG. 14A) to the vide shooting screen (FIGS. 14C and 14D). The controller 210 records a video file indicating the live view image 45 sequentially received from the digital camera 100 after the operation of the recording button 46 in the memory 220 of the information support terminal 200 (S32). The video file includes audio data collected by the microphone 160 in synchronization with video shooting by the digital camera 100, for example.

The controller 210 determines the file name of the video file on the basis of the cut allocation data D1 and the number of takes that have been shot for the selected cut, for example. The controller 210 may provide the determined file name in the instruction to the digital camera 100. The controller 135 of the digital camera 100 starts shooting of a video in accordance with an instruction from the information support terminal 200 received via the communication module 155, for example.

At this time, the controller 135 repeats the imaging operation of the image sensor 115 and records the video data of the shooting result in the memory card 142 via the card slot 140, for example. The video data includes audio data of a sound collection result of the microphone 160, for example. The controller 135 may start sound collection synchronized with video shooting in the digital camera 100 from such an imaging instruction.

For example, on the vide shooting screen of FIG. 14D, the recording stop button 46*a* receives a user operation for stopping shooting and recording of a video. The marking button 48 receives a user operation of performing marking at a timing desired by the user during shooting of the video. For example, the user can use the marking button 48 at a timing desired to be referred to at the time of video editing of post-processing.

Thereafter, the controller 210 performs various types of control so as to stop the shooting and recording of the video in response to the user operation of the recording stop button 46*a* (S33). For example, in step S33, the controller 210 instructs the digital camera 100 to stop shooting and recording of a video via the communication interface 250. The controller 210 stops video recording of the live view image 45 in the information support terminal 200 (S33). The controller 135 of the digital camera 100 ends shooting a video in accordance with an instruction from the information support terminal 200.

For example, in order to prompt the user to rate the video of the take shot as described above, the controller 210 displays a rating screen on the display 240, as illustrated in FIG. 9 (S34).

The controller 210 receives a user operation of the various buttons 41 to 43 on the rating screen as illustrated in FIG. 9, and acquires the rating of the user as a result of the rating of the video of the shot take, for example (S35). In the present embodiment, every time a video of one take is shot, a user can arbitrarily select a desired rating from the above three types of rating "OK", "KEEP", and "NG" for a video shot without interfering with rating of a video of another take in particular.

The controller 210 determines whether or not the rating is "NG" on the basis of the acquired rating of the user, for example (S36). For example, when the rating of the user is "OK" or "KEEP", the determination in step S36 is "NO".

When the acquired rating of the user is not "NG" (NO in S36), the controller 210 sets the shooting completion flag of the cut associated with the take (i.e., the selected cut) in the cut allocation data D1 to "ON" (S37). For example, in the case where the number of takes of the video is "1", or the case where a rating of a video of an existing take is "NG" in the number of takes equal to or greater than "2", the shooting completion flag is switched from "OFF" to "ON" by the execution of step S37.

On the other hand, when the acquired rating of the user is "NG" (YES in S36), the controller 210 proceeds to step S38 without particularly updating the setting of the shooting completion flag. Thus, when the shooting completion flag of the corresponding cut is in the OFF state when the video having the rating "NG" is shot, the OFF state is kept, for example. For example, when a video of a take shot in the past has "KEEP" or "OK", and thus the shooting completion flag is in an ON state, the ON state is kept.

The controller 210 generates metadata of a video of a take shot as described above, and records the metadata in the cut allocation data D1 in the memory 220, for example (S38). Such video metadata D2 is illustrated in FIG. 15.

For example, as illustrated in FIG. 15, the video metadata D2 includes "video file name", "rating information", "timer period", and "marker information". The controller 210 provides the video file name determined to reflect the number of takes for the video shot in steps S32 to S33, the rating of the user acquired in step S35, and the timer period set in step S31 in the video metadata D2. When the user operation of the marking button 48 is performed, the controller 210 specifies the timing of the user operation during the video shooting time and provides the timing in the video metadata D2 as marker information.

The controller 210 stores the generated video metadata D2 in the video metadata list in the cut associated with the video in the cut allocation data D1 of FIG. 6 (S38). The video metadata D2 is not particularly limited to the above, and may include the number of takes additionally or alternatively to the video file name, for example.

For example, the controller 210 ends the recording mode processing (S5) by storing the video metadata D2 (S38), and proceeds to step S1 of FIG. 8.

According to the recording mode processing (S5) described above, the present system 10 can shoot and record a video of one take of the selected cut and prompt the user to rate the cut (S32 to S35). The present system 10 manages an image shooting completion flag of the cut on the basis of the acquired rating information (S36, S37). In this way, the rating information of the user for each take can be appropriately reflected in the management of whether or not the cut is in the shooting completion state. In addition, according to the recording mode processing (S5) according to the present embodiment, the information support terminal 200 can control the shooting and recording of the video by the digital camera 100 to realize the management of the video shooting.

In the rating (S34 and S35) of the video of each take, a plurality of takes of the same rating may be present among a plurality of takes associated with the same cut. For example, a video of a plurality of takes for the same cut may have a rating "OK".

In addition, the rating screen displayed in step S34 may be displayed as a dialog. For example, the controller 210 may control the display 240 to superimpose and display the dialog of the rating screen on the display screen before and after step S33.

For example, the recording standby screen in the recording mode (FIG. 14A) may further include a return button 15 for an operation of returning the screen transition to the cut selection screen. The return operation may be a swipe operation in a predetermined one of the +X directions of the video management screen. The information support terminal 200 may shift to the playback mode by a swipe operation in the opposite direction.

2.2.4. Playback Mode

The playback mode processing in step S6 of FIG. 8 will be described with reference to FIGS. 16 to 17.

Figure 16:
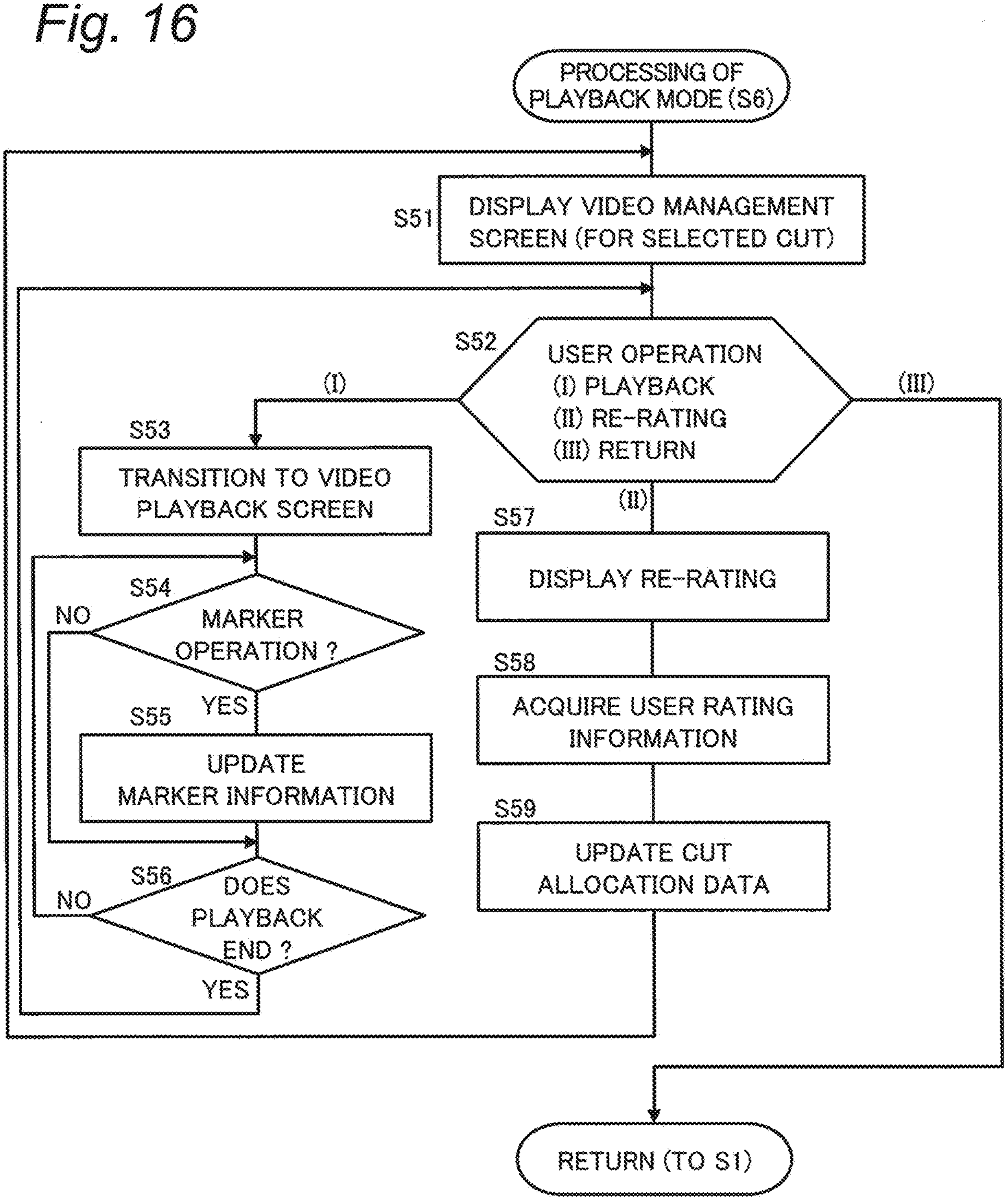
FIG. 16 is a flowchart illustrating playback mode processing in the imaging system.

FIG. 16 is a flowchart illustrating the playback mode processing (S6) in the present system 10. For example, the processing illustrated in the flow of FIG. 16 is started when a transition operation to the playback mode is input on the cut selection screen of FIG. 7 ((III) in S3).

Figures 17A, 17B, 17C:
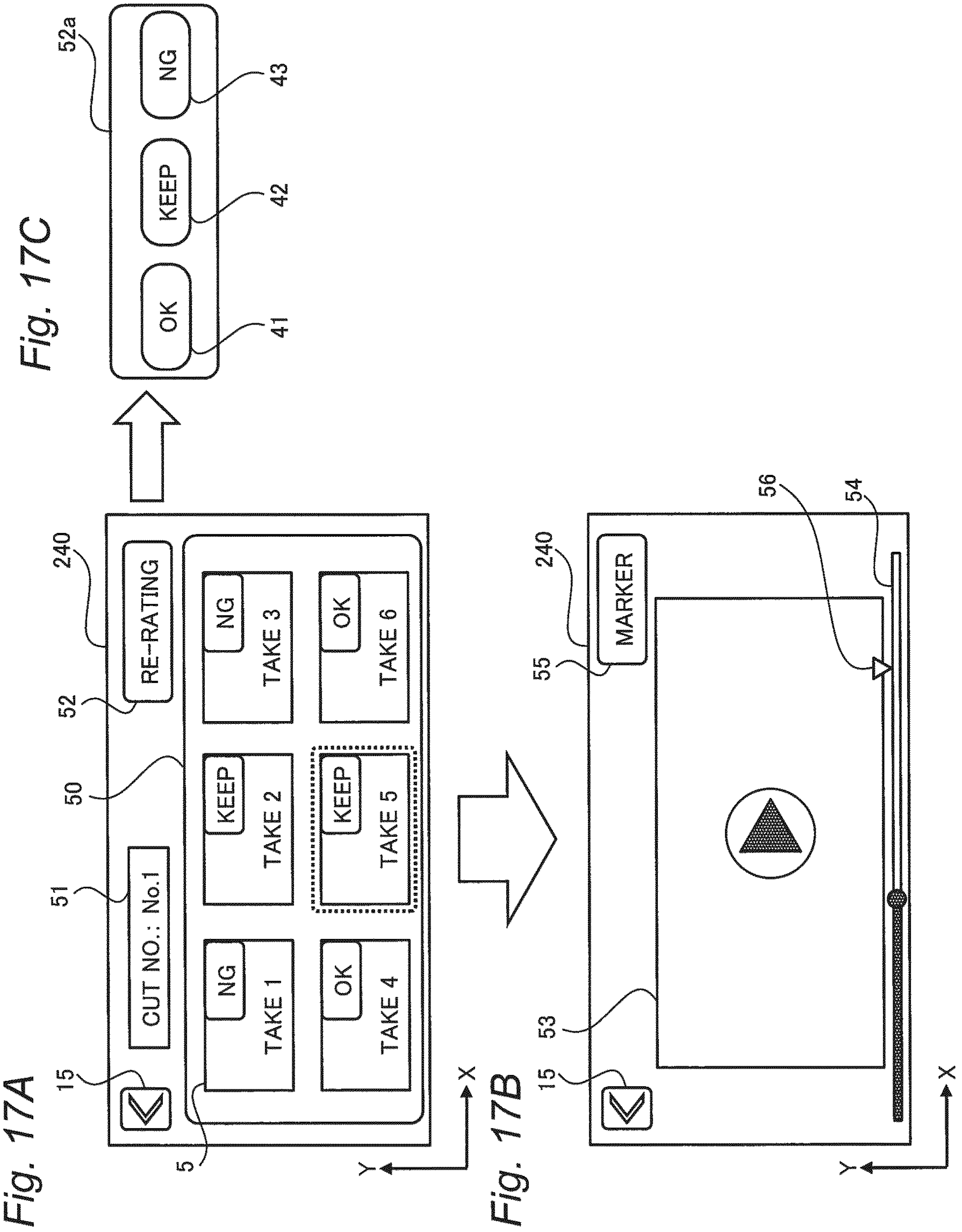
FIGS. 17A to 17C are diagrams illustrating a display example in a playback mode of the information support terminal.

First, the controller 210 of the information support terminal 200 causes the display 240 to transition to a screen for managing a video of a cut on the basis of the video file of the take associated with the selected cut and the cut allocation data D1 (S51). FIG. 17A illustrates a display example of the information support terminal 200 in step S51.

As illustrated in FIG. 17A, the video management screen in step S51 includes a cut identification field 51, a video list 50, a re-rating button 52, and the return button 15, for example. The cut identification field 51 displays identification information of the selected cut. The video list 50 includes a video icon 5 indicating a video for each take in the selected cut. For example, the video icon 5 is configured by superimposing the rating information on the thumbnail image of the video in the take.

In step S51 for example, referring to the video metadata list of the cut in the cut allocation data D1, the controller 210 generates each video icon 5 so as to visualize the rating information of each take associated with the cut. For example, the controller 210 arranges each video icon 5 in ascending order of the number of takes to generate the video list 50 (S51).

For example, as illustrated in FIG. 17A, the controller 210 receives various user operations via the user interface 230 in a state where the display 240 displays the video management screen (S52). The target user operation in step S52 includes (I) a playback selection operation, (II) a re-rating operation, and (III) a return operation.

The playback selection operation ((I) in S52) is a user operation of selecting a video file to be played, and is an operation of tapping a desired video icon 5 in the video list 50 displayed on the video management screen, for example.

The re-rating operation ((II) in S52) is a user operation for re-rating a video file, and is an operation of tapping the re-rating button 52 and then tapping a desired video icon 5, for example.

The return operation ((III) in S52) is a user operation of returning to the function selection screen from the playback mode, and is an operation of the return button 15 on the video management screen, for example. The return operation in (III) in step S52 may be a swipe operation in a predetermined one of the +X directions of the video management screen, for example. The information support terminal 200 may shift to the recording mode by a swipe operation in the opposite direction.

When the playback selection operation is input ((I) in S52), the controller 210 causes the display 240 to transition to a screen for reproducing and displaying the selected video file (S53). A display example of the information support terminal 200 in step S53 is illustrated in FIG. 17B.

As illustrated in FIG. 17B, the playback screen in step S53 includes a playback image 53, a playback control bar 54, a marker button 55, and the return button 15, for example. The controller 210 causes the user interface 230 to receive various user operations related to the playback screen. For example, the user can switch playback/pause of a video by a tap operation on the playback image 53, and change the playback position by a tap operation on the playback control bar 54.

The playback control bar 54 indicates a playback timing in the time length of the entire video, and the marker 56 is arranged at a position indicating a specific timing. For example, the controller 210 arranges the marker 56 on the playback control bar 54 with reference to the marker information of the video metadata D2.

On the playback screen of FIG. 17B, the user can newly arrange the marker 56 by operating the marker button 55 or change the arrangement position by drag operation of the marker 56. When receiving such various marker operations (YES in S54), the controller 210 updates the marker information in the video metadata D2 according to the marker operation (S55).

For example, when a user instruction to end playback of the video is input by operation of the return button 15 (YES in S56), the controller 210 causes the display 240 to transition from the playback screen (FIG. 17B) to the video management screen (FIG. 17A) for example, and returns to step S52.

When the re-rating operation ((II) in S52) is input on the video management screen (FIG. 17A), the controller 210 causes the display 240 to display a screen for prompting the user to perform re-rating (S57). A display example in step S57 is illustrated in FIG. 17C.

FIG. 17C illustrates a re-rating dialog 52*a* superimposed and displayed on the video management screen by the display 240, for example. Similarly to the rating screen (FIG. 9), the re-rating dialog 52*a* includes various buttons 41 to 43 as options of the rating of the user. The controller 210 receives user operations of the various buttons 41 to 43 on the re-rating dialog 52*a*, and acquires rating information indicating a re-rating result for the take of the video icon 5 selected by the user in (II) in step S52 (S58).

Next, the controller 210 updates the cut allocation data D1 on the basis of the rating information of the re-rating result, for example (S59). For example, the controller 210 rewrites the rating information of the take in the video metadata list of the selected cut, and manages the shooting completion flag of the selected cut in consideration of the re-rating result. For example, when, from a state in which all the pieces of rating information of the takes associated with the selected cut are in a state of "NG", any of the pieces of rating information is changed to a state of "KEEP" or "OK" by re-rating, the shooting completion flag is switched from OFF to ON.

Thereafter, the controller 210 returns to step S51 and updates the video list 50 on the video management screen so as to reflect the re-rating result on the video icon 5 of the take.

For example, when the return operation ((III) in S52) is input on the video management screen (FIG. 17A), the controller 210 ends the playback mode processing (S6) and returns to step S1 of FIG. 8. When re-rating is performed in the playback mode (S58), the cut list 30 is updated to reflect new rating information in the subsequent cut list generation processing (S1).

According to the playback mode processing (S6) described above, the user can check the videos of various takes related to the selected cut in the playback display (S53 to S56), and perform the rating again according to the check result (S57 to S58). The user can arrange the marker 56 at a desired timing at the time of checking the video, and can easily perform subsequent video editing and the like.

2.3. Export Function

An outline of the export function in the information support terminal 200 of the present system 10 will be described with reference to FIG. 18.

Figure 18:
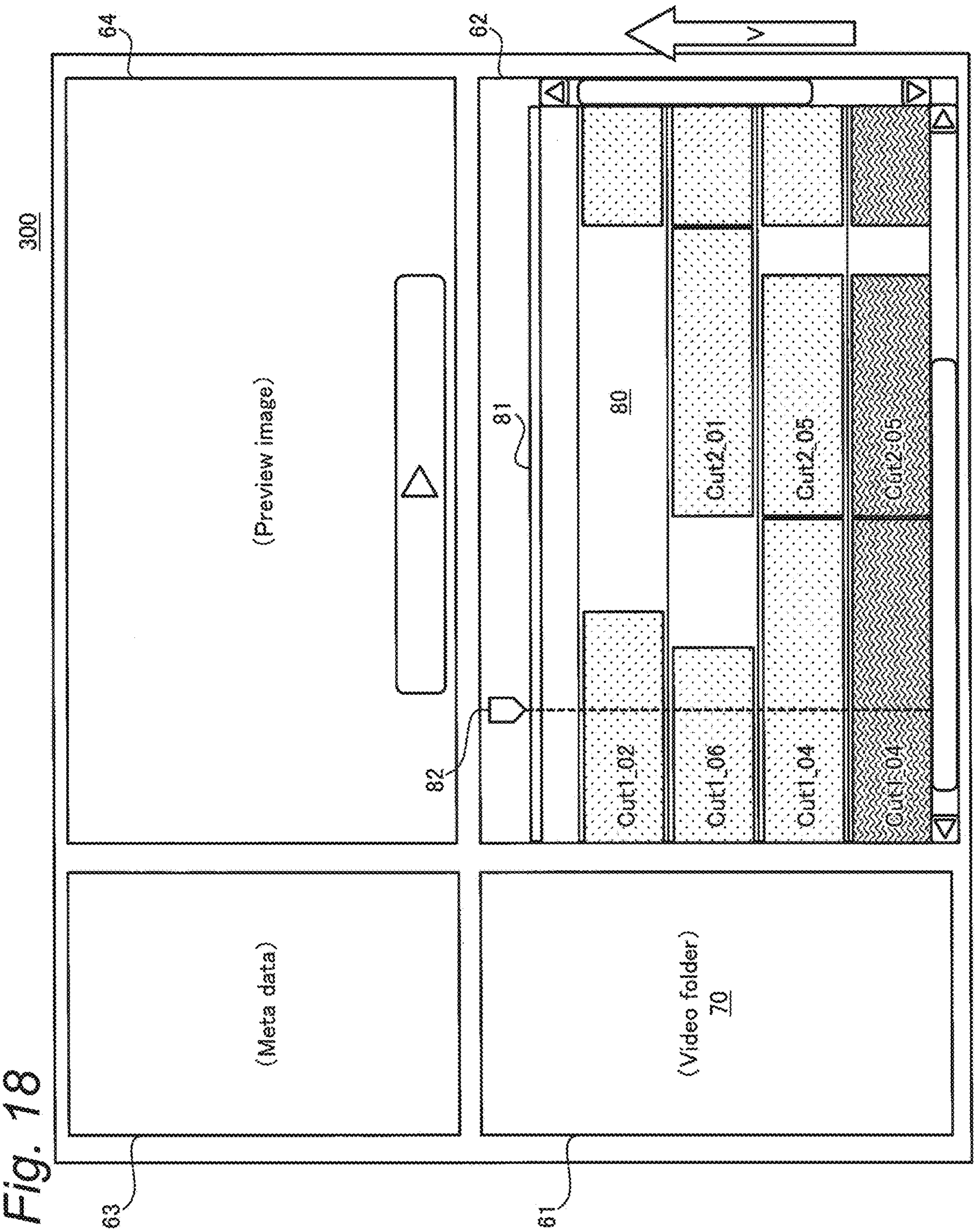
FIG. 18 is a diagram illustrating a display example of a video editing screen in a video editing PC of the imaging system.

FIG. 18 illustrates a display example of a video editing screen in the video editing PC 300 of the present system 10. For example, the video editing PC 300 (FIG. 1) reads management data as the output of the export function by the information support terminal 200 and video data of an shooting result by the digital camera 100 into predetermined editing software, to display a video editing screen as illustrated in FIG. 18. The editing software may be a variety of non-linear editing (NLE) software, such as Da Vinci Resolve, Adobe Premix Pro, Final Cut Pro, or Vegas Pro.

The video editing screen illustrated in FIG. 18 includes a material display field 61, a timeline editing field 62, a metadata display field 63, and a preview image 64. The video editing screen is a screen for the user to perform various video editing operations, and is an example of an editing screen with the video editing PC 300 being an example of an external device.

The material display field 61 displays a list of video data (i.e., video materials) read as a material for video editing in the video editing PC 300. In the present system 10, the material display field 61 displays a video folder 70 that is a folder that manages the video material for each cut, for example (details will be described later).

The timeline editing field 62 displays a video timeline 80 including a plurality of video materials arranged on a time axis 81, and responds a user operation to edit a video work combining the video materials in the video timeline 80. The video timeline 80 has a track for each row in which video materials are arranged along the time axis 81. In the video timeline 80, the plurality of tracks are arranged in a direction V intersecting the time axis 81, and different video materials can be arranged at the same position on the time axis 81. Hereinafter, the +V side in the direction V of such arrangement may be referred to as an upper side, and the opposite-V side may be referred to as a lower side.

The metadata display field 63 displays metadata of the video material displayed in the material display field 61 or the timeline editing field 62. The preview image 64 displays an image in the video material at a timing corresponding to the position of the playback head 82 arranged on the time axis 81 in the video timeline 80.

For example, on the video editing screen (FIG. 18), the user can adjust the arrangement of the video material in the timeline editing field 62, or arrange a new video material in the material display field 61 in the video timeline 80 while checking the preview image 64. By such a user operation, an editing operation of a video work is performed in the present system 10.

The information support terminal 200 according to the present embodiment generates management data for systematically managing a video material so as to reflect cut allocation and the user rating in the export function in view of facilitating the user to perform then editing operation of the video work as described above after executing the cut shooting function, for example. According to the present system 10, the video editing process by the user can be easily performed, and the processing efficiency of the process by the video editing PC 300 can also be improved. Hereinafter, the export function of the present system 10 will be described in detail.

2.3.1. Overall Operation of Export Function

The overall operation of the export function in the present system 10 will be described with reference to FIGS. 19 to 22.

Figure 19:
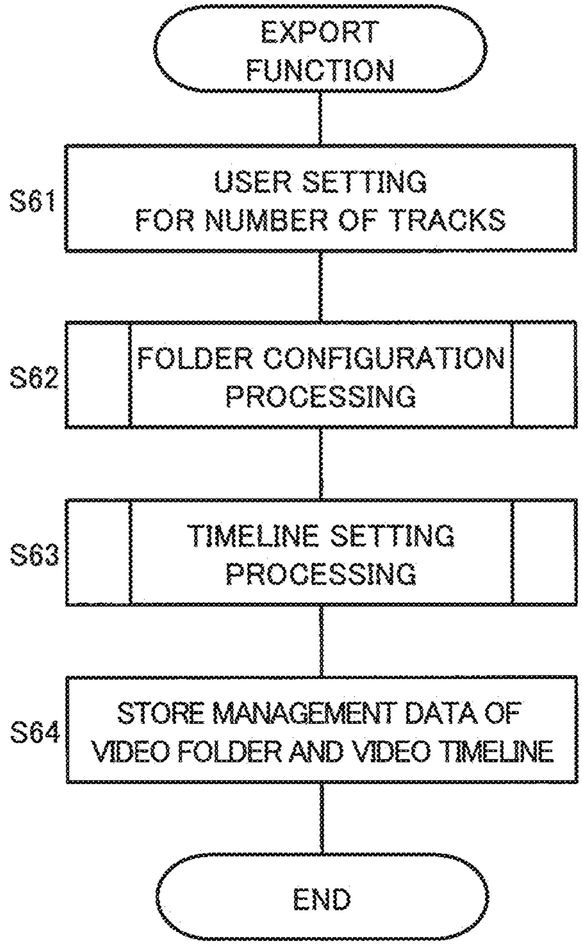
FIG. 19 is a flowchart illustrating an operation of an export function in the imaging system.

FIG. 19 is a flowchart illustrating an operation of the export function in the present system 10. Each processing of the flowchart of FIG. 19 is executed by the controller 210 of the information support terminal 200, for example. For example, the processing of this flow is started when the export button 13 on the function selection screen (FIG. 4) is operated with the cut allocation data D1, including the video metadata D2 by the cut shooting function, being stored in the memory 220.

First, the controller 210 of the information support terminal 200 sets the number of tracks that is the number of tracks in the video timeline 80, according to a user operation on the user interface 230, for example (S61). A display example in step S61 is illustrated in FIG. 20.

Figure 20:
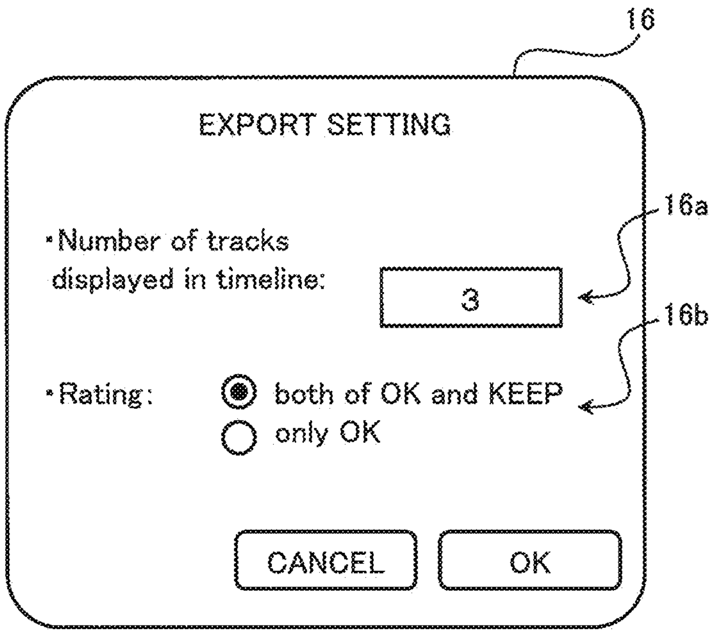
FIG. 20 is a diagram illustrating a display example in the export function of the information support terminal.

FIG. 20 illustrates the export setting dialog 16 superimposed on the function selection screen (FIG. 4) by the display 240, for example. For example, the export setting dialog 16 includes an input field 16*a* for the number of tracks in the video timeline 80 and a rating selection field 16*b*. For example, the controller 210 causes the user interface 230 to receive the user operation on the export setting dialog 16, and acquires the user setting of the video timeline 80 (S61).

In the export setting dialog 16, the input field 16*a* for the number of tracks receives an operation of inputting the number of tracks desired to be displayed on the video timeline 80 by the user in a predetermined numerical range (e.g., 1 to 20). For example, the rating selection field 16*b* responds a user operation to select "both of OK and KEEP" or "only OK" as an option to be displayed in the timeline. According to the rating selection field 16*b*, it is possible to preferentially display a video having a relatively high rating of "OK" in the video timeline 80 regardless of which option is selected.

For example, the controller 210 configures the video folder 70 displayed in the material display field 61 of the video editing screen (FIG. 18), based on the cut allocation data D1 (S62). The video folder 70 obtained by such a folder configuration processing (S62) is illustrated in FIG. 21.

Figure 21:
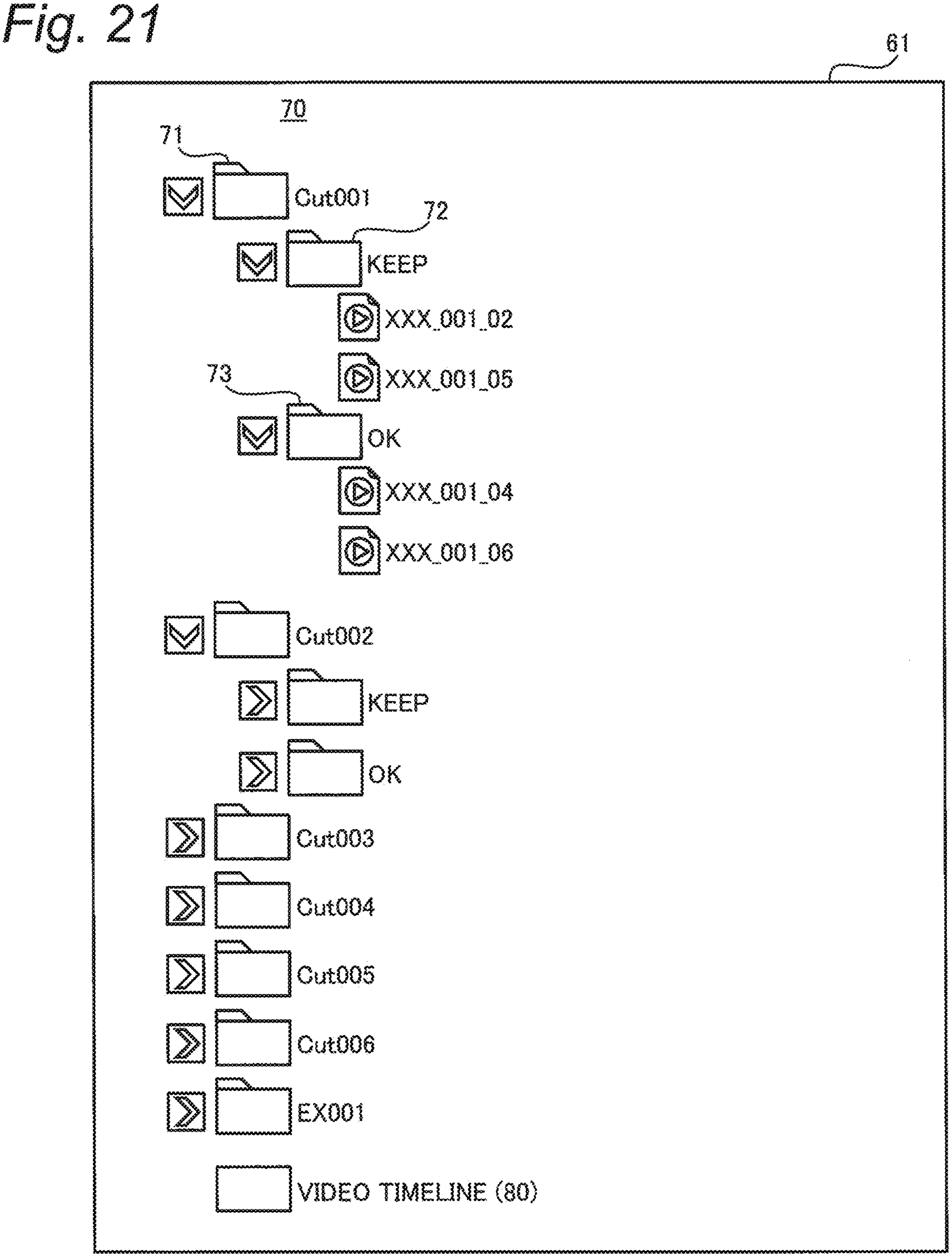
FIG. 21 is a diagram illustrating a video folder on the video editing screen.

As illustrated in FIG. 21, the video folder 70 includes a cut folder 71 that is a folder for each cut, and a KEEP folder 72 and an OK folder 73 that are provided in each cut folder 71, for example. The KEEP folder 72 stores a video file having a rating "KEEP" in the video material of the cut. The OK folder 73 stores a video file having a rating "OK" in the video material of the cut. In the folder configuration processing of step S62, a directory structure for realizing the configuration of the video folder 70 is automatically described in the management data by the controller 210. Details of the folder configuration processing (S62) will be described later.

The icon indicating the video file in the video folder 70 is an example of the video information in the present embodiment. In the material display field 61, as illustrated in FIG. 21, an icon indicating the video timeline 80 may be displayed together with the video folder 70 as described above. In the example of FIG. 21, the video icon in the cut folder 71 with the cut number "1" is displayed, but according to the video folder 70, other video icons in the cut folder 71 can also be displayed as appropriate by a user operation on the material display field 61.

Based on the result of the folder configuration processing (S62), the number of tracks set by the user, and the like (S61), the controller 210 sets the video timeline 80 displayed in the timeline editing field 62 (FIG. 18) at the start of video editing by the user (S63). The video timeline 80 obtained by such a timeline setting processing (S63) is illustrated in FIG. 22.

Figure 22:
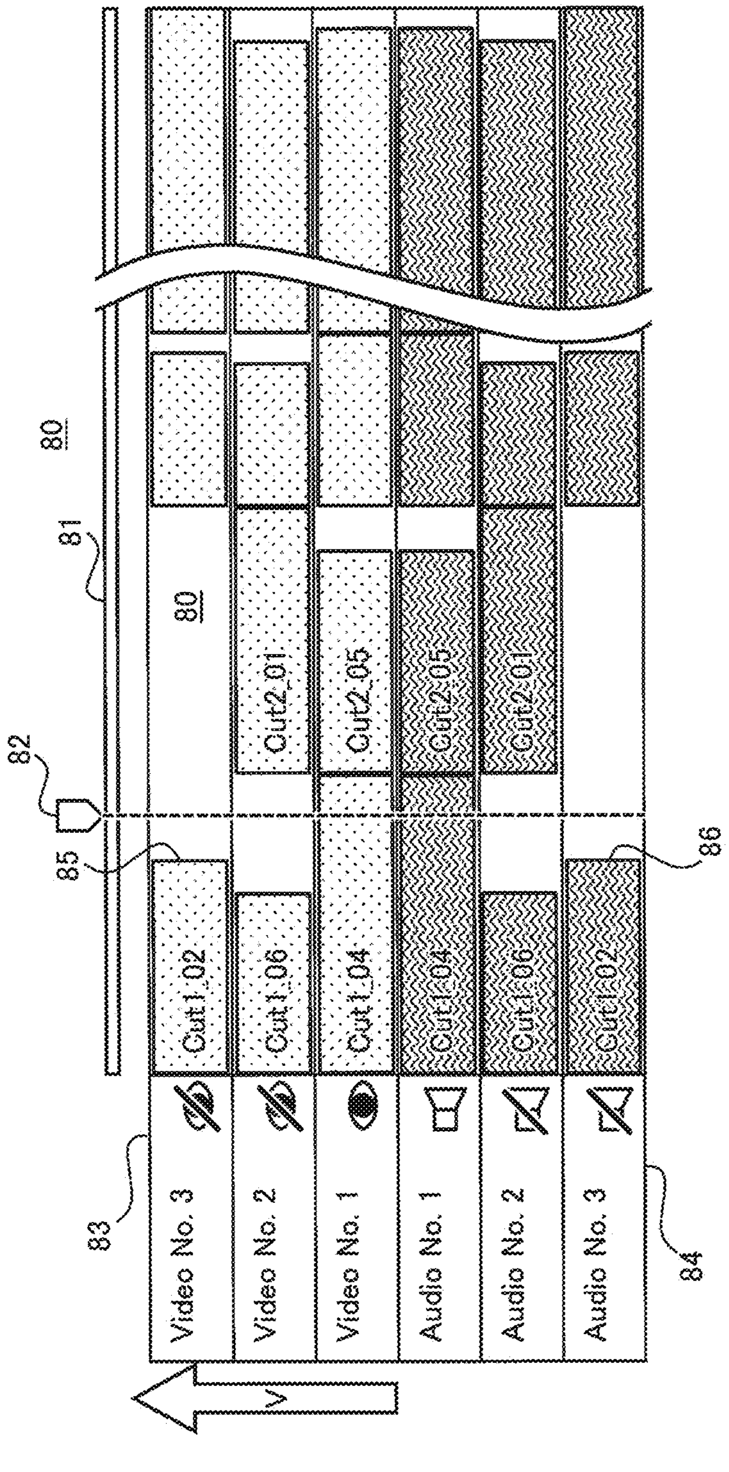
FIG. 22 is a diagram illustrating a video timeline on the video editing screen.

FIG. 22 illustrates the video timeline 80 when the number of tracks "3" and the display target "both of OK and KEEP" are set in step S61 in the video folder 70 of FIG. 21 and the video folder 70 of FIG. 21 is configured in step S62.

For example as illustrated in FIG. 22, the video timeline 80 includes video tracks 83 for the set number of tracks, and audio tracks 84 respectively corresponding to the video tracks 83. The video track 83 includes, for each cut, video clips 85 indicating images in video files. The audio track 84 includes audio clips 86 indicating sounds in the video files for each cut. Each of the video/audio clips 85 and 86 is an example of video information in the present embodiment.

In the example of FIG. 22, the video track 83 is arranged above (+V side) the audio track 84. In the present example, it is presumed that the video/audio tracks 83 and 84 with the track number "1" are adjacent to each other and are mainly used by the user to complete a video work. In this example, the lower (−V side) the video track 83 has a higher priority order, and the upper (+V side) the audio track 84 has a higher priority order.

In the timeline setting processing of step S63, the video timeline 80 is automatically set such that the video/audio clips 85 and 86 with a high rating are arranged in the video/audio tracks 83 and 84 having a higher priority order by reflecting the user rating. As a result, the video/audio clips 85 and 86 with the highest rating in each cut are arranged in the video/audio tracks 83 and 84 of the track number "1" mainly used by the user, for example. Details of the timeline setting processing (S63) will be described later.

For example, the controller 210 stores management data including the results of the folder configuration processing (S62) and the timeline setting processing (S63) described above in the memory 220 (S64), and ends the processing illustrated in the flow of FIG. 19.

According to the processing of the export function described above, the information support terminal 200 of the present system 10 can provide the video folder 70 and the video timeline 80 in which the process of editing the video of various cuts shot by the user according to the scenario in the video editing PC 300 is easily performed (S62, S63).

For example, according to the video timeline 80 (FIG. 22) provided by the present system 10, the video material with the highest rating in each cut is arranged in the video/audio tracks 83 and 84 with the track number "1" mainly used by the user. It can be expected that the video/audio tracks 83 and 84 are close to what is desirable for the user. As a result, the user can perform video editing so as to consider the difference from the video/audio tracks 83 and 84, for example. At this time, in the video timeline 80, as the video materials with a high rating in the same cut are arranged in the adjacent video/audio tracks 83 and 84, it is possible for the user to easily consider the difference.

According to the video folder 70 (FIG. 21) of the present system 10, videos of each take of the high rating "OK/KEEP" among the shooting results of the cut shooting function are systematically arranged in accordance with the priority order of rating for each cut, for example. As a result, the user can take out the video material rated as having a possibility of adoption from the video folder 70 and use the video material for editing even if the video material is not arranged in the video timeline 80, for example. By not including a video of a take with a low rating "NG" with no possibility of adoption in the video folder 70, the data amount of the video folder 70 can be suppressed, and the processing load of video editing in the video editing PC 300 can be reduced.

In the above description of step S61, the example of using the export setting dialog 16 of FIG. 20 is described. The user setting (S61) for the export function is not limited to the above example, and for example, the controller 210 may further receive a user operation of mode switching of arranging one track or a plurality of tracks in the video timeline 80. In this case, when the mode of one track is selected, the controller 210 may disable the user operation on the input field 16*a* of the number of tracks and set the number of tracks "1".

In the present system 10, the video folder 70 can adopt various configurations. For example, the OK folder 73 and the KEEP folder 72 are not necessarily provided in all the cuts, and for example, the OK/KEEP folders 73 and 72 may be omitted for additional cut. In the present system 10, a folder for storing a video of a take of the rating "NG" may be further provided in the video folder 70.

2.3.2. Folder Configuration Processing

Details of the folder configuration processing in step S62 of FIG. 19 will be described with reference to FIGS. 23 to 24.

Figure 23:
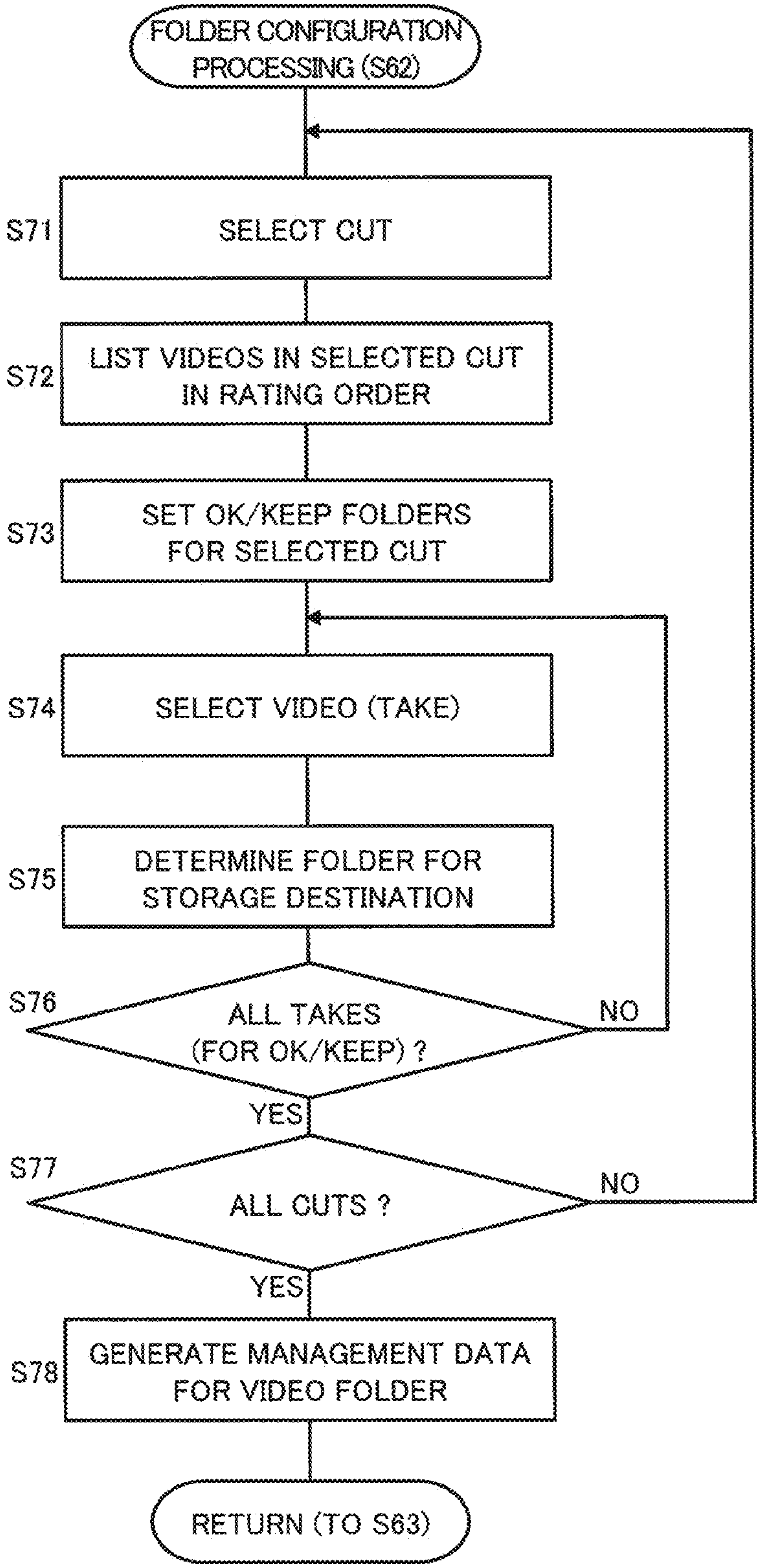
FIG. 23 is a flowchart illustrating folder configuration processing in the imaging system.

FIG. 23 is a flowchart illustrating folder configuration processing (S62) in the present system 10. FIG. 24 illustrates a data structure of the management data D3 by the folder configuration processing (S62). The management data D3 of FIG. 24 corresponds to the video folder 70 of FIG. 21.

First, the controller 210 selects one cut from a plurality of cuts included in the cut allocation data D1 (S71). Step S71 is performed to set the storage destination of the video material for one cut. For example, the normal cut is sequentially selected in ascending order for the cut number in the cut allocation data D1. In the case with an additional cut, the additional cut is sequentially selected in ascending order for the additional cut number after the normal cut.

Next, the controller 210 lists information on each file of the video material of the cut in the rating order on the basis of the video metadata list of the selected cut in the cut allocation data D1, for example (S72).

For example, the controller 210 generates a video material list in which video file names of each take are arranged in order from "OK" of high rating to "KEEP", based on the rating information in the video metadata D2 of each take being cut. In such a video material list, ascending order is used for the number of takes between takes of the same rating, for example. The video material list does not need to include a video file name of a take of low rating "NG", for example.

Figure 24:
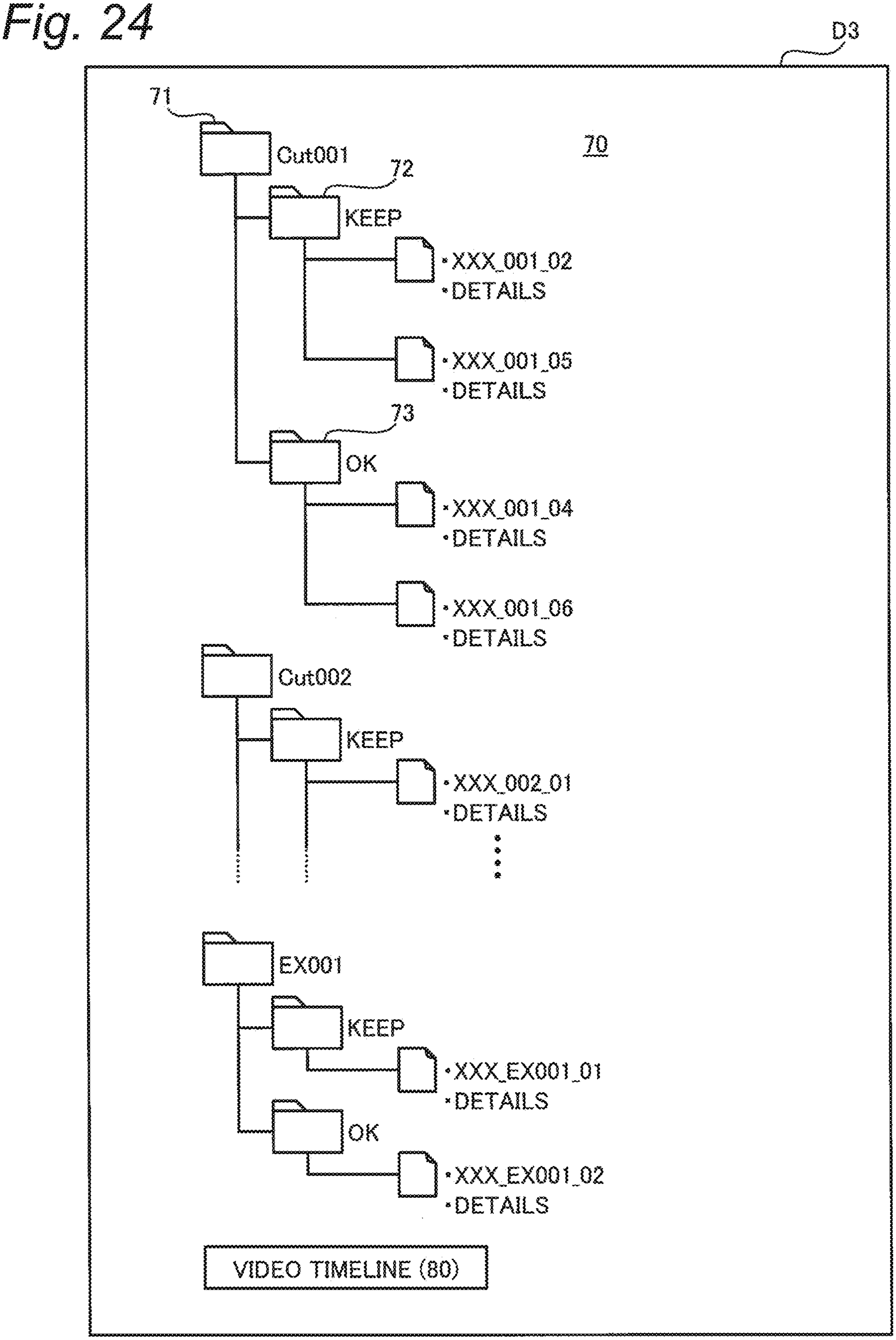
FIG. 24 is a diagram illustrating a data structure of management data by folder configuration processing.

As illustrated in FIG. 24, the controller 210 provides the cut folder 71 (FIG. 21) for the selected cut, and a folder for rating such as the OK folder 73 and the KEEP folder 72 under the cut folder 71, for example (S73). For example, each of the folders 71 to 73 is described as a tag in the XML language.

Next, the controller 210 sequentially selects a video file of one take from the video material list obtained in step S72, for example (S74). In step S74, takes other than the rating "NG" for the selected cut are selected in the high rating order, for example.

For example, referring to the rating information of the selected take in the video metadata D2, the controller 210 determines a folder as a storage destination of the video of the take from the OK folder 73 and the KEEP folder 72 (S75). For example, when the take has the rating "OK", the controller 210 determines the OK folder 73 as the storage destination. On the other hand, when the take has the rating "KEEP", the KEEP folder 72 is determined as the storage destination.

Next, referring to the video material list in step S72, the controller 210 determines whether or not the storage destination of the video file of each take in the selected cut is determined, for example (S76). When a storage destination for any video file of a take is undecided (NO in S76), the controller 210 again performs the processing in and after step S74 on the take that has not been stored. As a result, all takes having the rating "OK" or "KEEP" for the selected cut can be stored in the corresponding cut folder 71.

For example, when the storage destination of the video file of each take in the selected cut is determined (YES in S76), the controller 210 determines whether or not processing for folder configuration (S71 to S76) is performed for all cuts in the cut allocation data D1 (S77). When an unprocessed cut is present (NO in S77), the controller 210 performs the processing in and after step S71 again for the unprocessed cut. In this way, the video folder 70 in which the video files are stored in the rating order in all cuts is obtained.

For example, when the processing for folder configuration is performed for all cuts (YES in S77), the controller 210 generates the management data D3 for the video folder 70 by description in e.g. the XML language (S78).

For example, as illustrated in FIG. 24, the controller 210 provides a tag of each video file determined in step S75 under tags of the OK/KEEP folders 73 and 72 for each cut folder 71, to describe a video file name and detailed information (S78). The detailed information of the video file includes a time length of the video material, a timer period, and the like, for example.

With the generation of the management data D3 for the video folder 70, the controller 210 ends the folder configuration processing (S62) and proceeds to step S63 of FIG. 19. In step S63, information for the video timeline 80 in the management data D3 of FIG. 24 is automatically described, for example.

According to the above folder configuration processing (S62), the information support terminal 200 of the present system 10 can prepare the video folder 70 in which various video materials are systematically managed by reflecting the rating and scenario of the user before the video editing process. For example, the video editing PC 300 can store video data having the same file name in the shooting result of the digital camera 100 as a video file in the OK/KEEP folders 73 and 72 of each cut folder 71 in the video folder 70 according to the description of the management data D3 at the time of reading into the editing software.

2.3.3. Timeline Setting Processing

Details of the timeline setting processing in step S63 of FIG. 19 will be described with reference to FIGS. 25 to 26.

Figure 25:
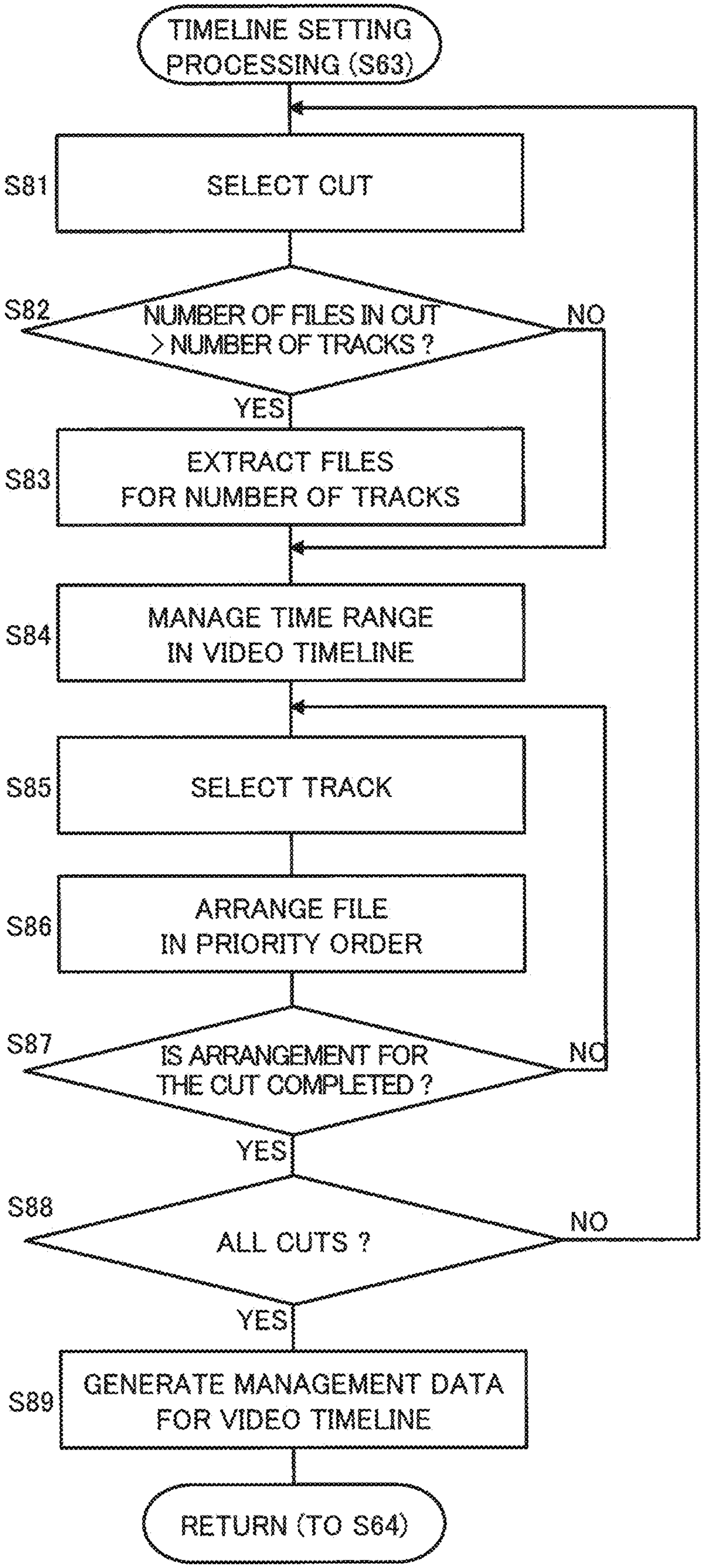
FIG. 25 is a flowchart illustrating timeline setting processing in the imaging system.

FIG. 25 is a flowchart illustrating the timeline setting processing (S63) in the present system 10. FIG. 26 illustrates a data structure of the management data D3 by the timeline setting processing (S63). The management data D3 of FIG. 26 is an example of sequence information corresponding to the timeline 80 of FIG. 22.

First, based on the management data D3 for the video folder 70 by the folder configuration processing (S62), the controller 210 selects one cut folder 71 from among the plurality of cut folders 71, for example (S81). Step S81 is processing for determining the arrangement of the video material in the video timeline 80 for each one cut, and is performed in ascending order for the normal cut, for example.

Next, the controller 210 determines whether the number of video files in the selected cut folder 71, that is, the number of files is larger than the number of tracks set in step S61 of FIG. 19, for example (S82).

The number of files in step S82 is the total number of video files of takes having the rating "OK" or "KEEP" in the specific cut folder 71, for example. Note that, in step S61 of FIG. 19, when the rating of the display target in the video timeline 80 is set to "only OK" (see FIG. 20), in step S82, the number of files having only the rating "OK" may be used in each cut folder 71.

When the number of files in the selected cut is larger than the number of tracks (YES in S82), the controller 210 extracts a video file to be arranged in the video timeline 80 in the cut, for example (S83). In step S83, video files for the number of tracks are extracted in high rating order from the cut folder 71 of the management data D3, for example (FIG. 24).

Next, referring to detailed information of each extracted video file, the controller 210 manages a time range for the cut in the video timeline 80, for example (S84). In the present system 10, the time range of the cut in the video timeline 80 is managed as the longest playback period of the video file to be arranged, for example. When a timer period is present, the playback period of the video is managed by excluding the timer period from the time length of the entire video.

On the other hand, when the number of files in the selected cut folder 71 is equal to or less than the number of tracks (NO in S82), the controller 210 sets all the video files in the cut folder 71 as arrangement targets, and proceeds to step S84 without performing the processing of step S83, for example. In this case, the management of the time range for the cut in the video timeline 80 (S84) is performed with reference to all the video files in the cut folder 71.

Next, the controller 210 sequentially selects one track in tracks for the set number of tracks (S85). Step S85 is processing for arranging the video material on each track in the cut.

For example, the controller 210 selects the video track 83 (and the audio track 84) in ascending order from the track number "1" in the video timeline 80 of FIG. 22 (S85). For example, as illustrated in FIG. 26, the controller 210 performs initial setting for playback of the preview image 64 (FIG. 18) along the video timeline 80 on each of the video/audio tracks 83 and 84. For example, the video/audio tracks 83 and 84 with the track number "1" are set to enable playback display and audio output, and the other video/audio tracks 83 and 84 are set to disable.

Next, the controller 210 determines the arrangement of the video material in the selected track for the cut, based on the management data D3 (FIG. 24) of the video folder 70, for example (S86).

In step S86, the controller 210 first specifies a video file name of the video material corresponding to the priority order of the track selected for the cut, and determines various timing information for the video material, for example. For example, referring to the timer period of the video material having the specified file name, the controller 210 determines the start timing to be adopted in the video timeline 80 in the video material. For example, in the case of the timer period "5 seconds", the timing five seconds after the beginning of the video material is determined as the adoption start timing.

Furthermore, the controller 210 sets a timing to start reproducing of the video material and a timing to end the playback in the video timeline 80 (S86). In the present system 10, the playback start timing is set to be common among the video files within the cut. For example, the playback start timing is set to the start timing of the video timeline 80 for the first cut, and is set to the end of the time range of the previous cut, that is, the playback end timing of the longest video file for the second and subsequent cuts. The playback end timing of the video material is set to a timing after the playback start timing by the playback period of the file.

In step S86, the controller 210 sets the arrangement of the video clip 85 of the video material in the video track 83 so as to reflect the various timing settings as described above. Similarly to the setting of the video clip 85, the controller 210 sets the arrangement of the audio clip 86 of the video material in the audio track 84 (S86).

Next, the controller 210 determines whether or not the arrangement setting of the video material for the cut is completed, for example (S87). For example, when the arrangement setting of the video material for the set number of tracks has been performed for the cut, the controller 210 proceeds to YES in step S87. Alternatively, for cut in which the number of video materials in the cut folder 71 is less than the number of tracks, the controller 210 proceeds to YES in step S87 when the arrangement setting of all the video materials in the cut folder 71 has been performed, and proceeds to NO otherwise.

When the arrangement setting of the video material for the cut is not completed (NO in S87), the controller 210 performs the processing in and after step S85 on the video material not arranged in the cut. In this way, the arrangement of the video/audio clips 85 and 86 is performed within the range of the number of tracks for the cut (S86).

For example, when the arrangement setting of the video material for the cut is completed (YES in S87), the controller 210 determines whether or not the arrangement setting for all cuts to be arranged in the video timeline 80 is completed (S88). The determination in step S88 is performed within the range of the normal cut except for the additional cut, for example.

When a normal cut is unset in the video timeline 80 (NO in S88), the controller 210 performs the processing in and after step S81 again for the unset normal cut. In this way, the video timeline 80 in which the video files are arranged in the rating order in all the normal cuts is obtained.

For example, when the arrangement setting for all the normal cuts is completed (YES in S88), the controller 210 generates the management data D3 for the video timeline 80 by description in the XML language, for example (S89).

Figure 26:
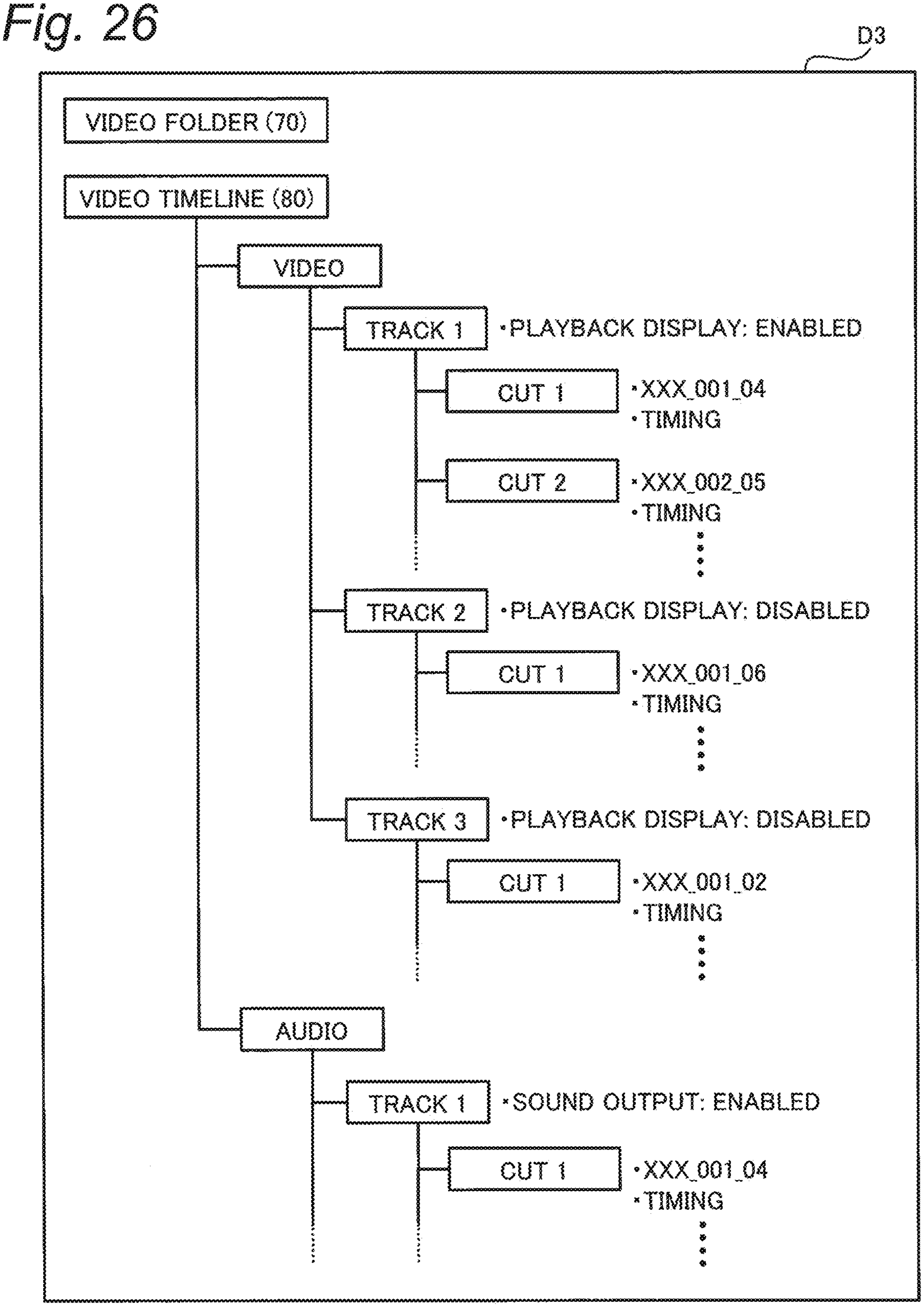
FIG. 26 is a diagram illustrating a data structure of management data by timeline setting processing.

In step S89, for the exemplary tag of the video timeline 80 in the management data D3 of FIG. 24, the controller 210 provides a tag for each of the video and the audio, and provides a tag for each track number under each tag, as illustrated in FIG. 26. Furthermore, the controller 210 describes, for each cut in the tag of each track number, information related to arrangement setting such as the video file names and the timing information of the video/audio clips 85 and 86 determined in step S86.

With the generation of the management data D3 for the video timeline 80, the controller 210 ends the timeline setting processing (S63) and proceeds to step S64 of FIG. 19.

According to the above timeline setting processing (S63), the information support terminal 200 of the present system 10 can prepare the video timeline 80 in which the video/audio clips 85 and 86 are arranged according to the scenario so as to reflect the rating of the user before the video editing process. The user can start video editing without arranging the video material after the cut shooting function according to the scenario, and then, the video timeline 80 reflecting his/her rating can be obtained.

For example, the user can check the video/audio clips 85 and 86 for each cut on the video timeline 80 in the video editing process. At this time, as the playback display/audio output of the video/audio clips 85 and 86 with the track number "1" is enabled in the initial setting, the check can be performed from the video material with the highest rating. The enabled/disabled state of the playback display/audio output can be appropriately switched by the video editing PC 300 according to the user operation on the video editing screen.

In the present system 10, for the prepared video timeline 80, the time ranges of the plurality of video/audio clips 85 and 86 are managed to be aligned between the separate video/audio tracks 83 and 84 for each cut (see S84, FIG. 22). According to this, the user can more easily check each of the clips 85 and 86 for each cut in the video editing process than the clips 85 and 86 are arranged at close time intervals in the tracks 83 and 84.

The management of the time range in step S84 is performed on the basis of the longest playback period of the video material arranged at each cut, for example (see FIG. 22). Accordingly, it is possible to avoid a situation in which overlapping clips occur between adjacent cuts, and it is possible to easily check for each cut, for example.

In the present embodiment, the management of the time range for each cut (S84) is not particularly limited to the longest playback period of each cut, and may be performed on the basis of various time lengths of the video material for each cut. For example, the controller 210 may manage the time range of each cut in the video timeline 80 so as to match the playback period of the video material with the highest priority order (S84).

3. Review

As described above, in the present embodiment, the information support terminal 200 as an example of an electronic device manages a video in a scenario including a plurality of cuts. The information support terminal 200 includes a display 240 that displays information, a user interface 230 as an example of an input interface that inputs an operation of a user, and a controller 210 that controls the display 240 in accordance with the operation input on the user interface 230. The controller 210 causes the display 240 to display a rating screen to acquire rating information from the user interface 230, the rating screen prompting the user to rate the video associated with each cut of the plurality of cuts (S5, S6), the rating information indicating user rating of the video (cf. FIGS. 9 and 17C). The controller 210 generates management data D3 in accordance with the acquired rating information (S62 to S64), the management data D3 managing a priority order in which video information is arranged on a video edit screen (FIG. 18) as an example of an edit screen for editing a plurality of videos associated with the plurality of cuts, and the video information indicating each of the videos.

According to the information support terminal 200 described above, based on the management data D3 managing the priority order for the arrangement of the video information on the video edit screen, the workflow for editing the video along with the scenario can be facilitated for the user. The present system 10 can improve the processing efficiency for the workflow in e.g. the video editing PC 300, based on the management data D3 such as the video timeline 80.

In the information support terminal 200 according to the present embodiment, the controller 210 generates the management data D3 in accordance with the acquired rating information to arrange the video information on the edit screen for each cut with a higher priority as the video information indicates the video having a higher rating indicated by the rating information (S62, S63). According to this, the video edition can be facilitated by the priority arrangement of the video information with the high rating.

In the information support terminal 200 according to the present embodiment, the management data D3 includes a video folder 70 configured by a plurality of folders indicating the priority order based on the rating information for each cut, and defines the video to be stored in each of the plurality of folders (cf. FIG. 24). The information support terminal 200 can facilitate to edit the video by generating the management data D3 of the video folder 70 to realize the management of the video material systematically in the video editing screen.

In the information support terminal 200 according to the present embodiment, the video folder 70 in the management data D3 may not include a folder corresponding to a first rating (e.g. "NG") but include folders 72, 73 each corresponding to a second folder (e.g. "OK/KEEP"). Accordingly, the data amount can be reduced for loading into the video editing PC 300, reflecting the user rating.

In the information support terminal 200 according to the present embodiment, the management data D3 includes data for the video timeline 80 as an example of sequence information in which the video information is arranged in an order of the plurality of cuts in the scenario (cf. FIG. 26). The controller 210 generates the sequence information to arrange the video information in accordance with the priority order for each cut (S89). Accordingly, the video edition can be facilitated by arranging the video material in accordance with the user rating in the video timeline 80 in which the video material is arranged for each cut along with the cut in the video editing screen.

In a fifth aspect, in the information support terminal 200 according to the present embodiment, the controller 210 generates the sequence information to align arrangement of the video information for each cut, based on a time length of the video for each cut. Accordingly, the video edition can be facilitated, letting the user enable to easily check the video material for each cut in the video timeline 80.

In the information support terminal 200 according to the present embodiment, the controller 210 receives a user operation to set the number of the takes as an example of a predetermined number by the user interface 230 (S61), and generates the sequence information to arrange the predetermined number or less of pieces of the video information for each cut (S82 to S87, S89). Accordingly, the video edition can be facilitated by setting the number of the video materials for each cut in the video timeline 80 within a range desirable for the user.

In the information support terminal 200 according to the present embodiment, the controller 210 receives the user operation to set a predetermined period by the user interface 230 (S31), and generates the sequence information to arrange the video information with removing the predetermined period in the video (S84, S89). Accordingly the video edition can be facilitated by managing the arrangement of the video information in the video editing screen in the external device, based on the management data D3.

In the information support terminal 200 according to the present embodiment, the management data D3 includes a data structure that causes the video editing PC 300 as an example of an external device for displaying the video edit screen to display the video edit screen with the video information being arranged in accordance with the priority order, such as the descriptions of the tag in the XML language, for example (cf. FIGS. 24 and 26). The information support terminal 200 can facilitate to edit the video in the external device by managing the arrangement of the video information in the video editing screen in the external device.

In the present embodiment, the information support terminal 200 further includes a memory 220 that stores cut allocation data D1 as an example of the management information that manages the video associated with each of the plurality of cuts in the scenario. The controller 210 generates the management data D3, based on the management information and the rating information (S62 to S64). Accordingly, the video edition for each cut can be facilitated.

In the present embodiment, the information support terminal 200 further includes a communication interface 250 that communicates data with an imaging apparatus for shooting the video. The controller 210 manages a video shot with the imaging apparatus by data communication via the communication interface 250 (S5). Accordingly, the information support terminal 200, which is separate from the digital camera 100, can facilitate to manage the video shooting for each cut.

In the present embodiment a video management method for managing a video in a scenario including a plurality of cuts is provided. The method includes: causing, by the controller 210 of the information support terminal 200, a display 240 to display a rating screen to acquire rating information from an user interface 230 (S5, S6), the rating screen prompting a user to rate the video associated with each cut of the plurality of cuts, and the rating information indicating user rating of the video (cf. FIGS. 9 and 17C). The controller 210 generates management data D3 in accordance with the acquired rating information, the management data D3 managing a priority order in which video information is arranged on the video editing screen (FIG. 18) as an example of the edit screen for editing a plurality of videos associated with the plurality of cuts, and the video information indicating each of the videos (S62 to S64).

In the present embodiment, a program for causing the controller 210 to execute the video management method described above is provided. According to such a video management method, it is possible to facilitate to edit the video with a scenario including a plurality of cuts. In the present system, the above-mentioned information management for each cut is not necessarily to limit with a unit of one cut, and may be done with a unit of a set of cuts including multiple cuts.

Other Embodiments

As described above, the first embodiment has been described as an example of the technology disclosed in the present application. However, the technique in the present disclosure is not limited thereto, and can also be applied to embodiments in which changes, substitutions, additions, omissions, and the like are made as appropriate. In addition, it is also possible to combine the components described in the above embodiments to form a new embodiment.

In the first embodiment described above, the information support terminal 200 has been described as an example of an electronic device different from the imaging apparatus, but the present disclosure is not limited thereto. The electronic device according to the present embodiment may be integrated with an imaging apparatus that performs video shooting. Such a modification will be described with reference to FIG. 27.

Figure 27:
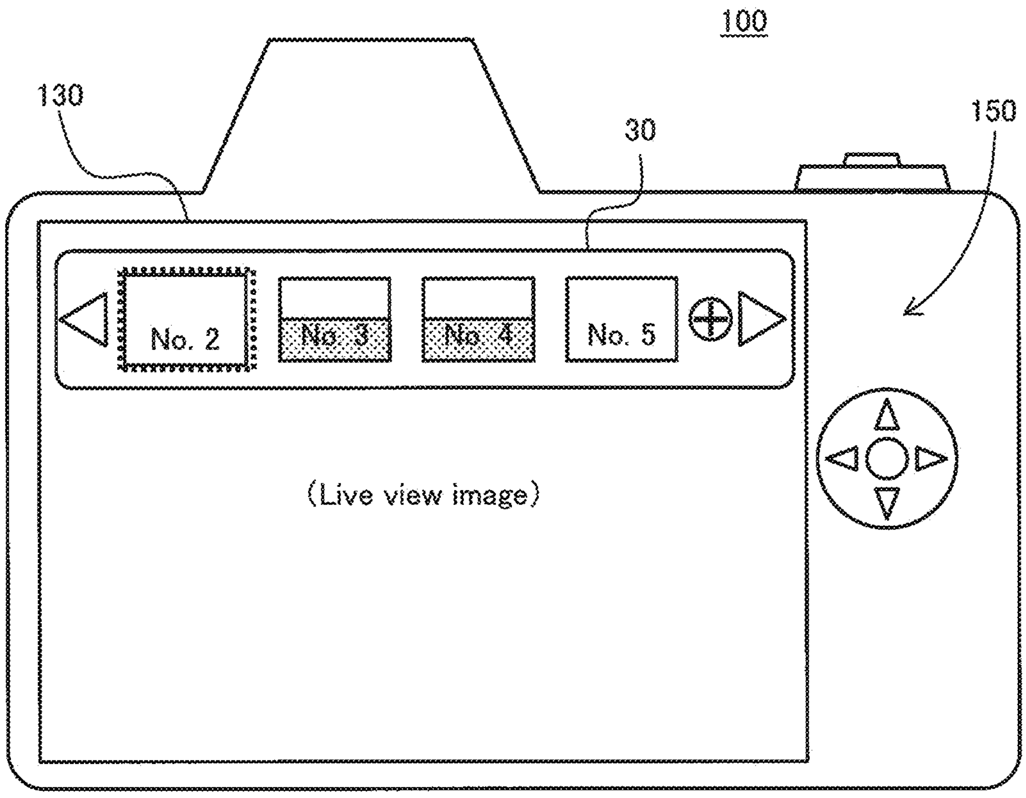
FIG. 27 is a diagram for explaining a modification of the digital camera.

FIG. 27 illustrates a modification of the digital camera 100. In the present embodiment, the digital camera 100 has various functions such as the above-described cut shooting function of the information support terminal 200. For example, as illustrated in FIG. 27, the controller 135 of the digital camera 100 displays a cut selection screen including a plurality of cuts by the cut list 30 on the display monitor 130, and receives the cut selection by the user through the user interface 150 such as a touch panel or an operation button.

In the example of FIG. 27, the display monitor 130 superimposes and displays the cut list 30 on the live view image. The controller 135 of the digital camera 100 generates video data by an imaging operation of the image sensor 115, for example. When a video of the selected cut is shot, the controller 135 of the digital camera 100 displays a rating screen (FIG. 9) on the display monitor 130 to acquire rating information of the user, similarly to the recording mode processing of the first embodiment (FIG. 13). Similarly to the first embodiment, the digital camera 100 can also provide the user with the information support by the cut shooting function and the export function.

As described above, in the present embodiment, the digital camera 100 as an example of an electronic device further includes the image sensor 115 as an example of an image sensor that captures a subject image and generates image data. The controller 135 manages a video including image data generated by the image sensor 115. Consequently, the digital camera 100 can easily manage the video shooting for each cut.

In the above embodiments, the cut selection screen including the cut list 30 has been exemplified, but the selection screen of the present disclosure is not limited thereto. The selection screen according to the present embodiment may not include the cut list 30, and may include a plurality of cuts in a display mode different from the cut icon 3. In addition, the selection screen according to the present embodiment may be a dialog display, or may be superimposed and displayed on various display screens. In the present embodiment, the cut list 30 may be an example of the selection screen. In the present embodiment, the selection screen of the information support terminal 200 may identify and display whether or not the video shooting has been completed for each cut in various display modes other than the above-described example.

In the above embodiments, three types of examples in which the rating information is "OK", "KEEP", and "NG" have been described, but the rating information is not particularly limited thereto. In the present embodiment, the rating information may be three types of rating different from the above, and is not particularly limited to three types, and may be two types or four or more types. In the present embodiment, the rating information may be a score of a continuous value. The electronic device according to the present embodiment may receive a user input of such various types of rating information and manage video shooting for each cut. For example, the identification display can be performed by appropriately providing a criterion as to whether or not the video shooting of the cut is completed. In addition, the information support terminal 200 according to the present embodiment may set the priority order in the management data D3 so as to reflect such various ratings.

In the above embodiments, an example has been described in which the management data D3 includes the video folder 70 and the video timeline 80. In the present embodiment, the management data may include any one of the video folder 70 and the video timeline 80, and the other may be omitted. In addition, in the above embodiments, an example in which the management data D3 is described in the XML language has been described. In the present embodiment, the management data D3 is not limited to the XML language, and may be described in various markup languages or data description languages that can be supported by the editing software used in the video editing process. The management data D3 may be various kinds of metadata for managing a video in various cuts.

In the above embodiments, the information support terminal 200 as an example of an electronic device and the video editing PC 300 as an example of an external device have been described. In the present embodiment, the electronic device may be the video editing PC 300, and the video editing PC 300 may have various functions of the information support terminal 200 described above. In the present embodiment, the editing screen may be displayed not only on an external device but also on an electronic device. When an external display device is used in the video editing PC 300, the external device according to the present embodiment may include such a display device.

In the above embodiments, the digital camera 100 including the optical system 110 and the lens driver 112 has been exemplified. The imaging apparatus according to the present embodiment may not particularly include the optical system 110, the lens driver 112, and the like, and may be an interchangeable lens type camera, for example.

In the above embodiments, the digital camera has been described as an example of the imaging apparatus, but the present disclosure is not limited thereto. The imaging apparatus of the present disclosure has only to be an electronic device having an imaging function (e.g., a video camera, a smartphone, a tablet terminal, or the like). The electronic device of the present disclosure does not particularly need to have an image imaging function, and may be various electronic devices.

Aspect Examples

Hereinafter, various aspects of the present disclosure will be exemplified.

A first aspect according to the present disclosure is an electronic device for managing a video in a scenario including a plurality of sections. The electronic device includes: a display that displays information; an input interface that inputs a user operation; and a controller that controls the display in accordance with the user operation input by the input interface. The controller causes the display to display a rating screen to acquire rating information from the input interface, the rating screen prompting the user to rate the video associated with each section of the plurality of sections, the rating information indicating user rating of the video, and generates management data in accordance with the acquired rating information, the management data managing a priority order in which video information is arranged on an edit screen for editing a plurality of videos associated with the plurality of sections, and the video information indicating each of the videos.

In a second aspect, in the electronic device according to the first aspect, the controller generates the management data in accordance with the acquired rating information to arrange the video information on the edit screen for each section with a higher priority as the video information indicates the video having a higher rating indicated by the rating information.

In a third aspect, in the electronic device according to the first or second aspect the management data includes a plurality of folders indicating the priority order based on the rating information for each section, and defines the video to be stored in each of the plurality of folders.

In a fourth aspect, in the electronic device according to any one of the first to third aspects, the management data includes sequence information in which the video information is arranged in an order of the plurality of sections in the scenario. The controller generates the sequence information to arrange the video information in accordance with the priority order for each section.

In a fifth aspect, in the electronic device according to the fourth aspect, the controller generates the sequence information to align arrangement of the video information for each section, based on a time length of the video for each section.

In a sixth aspect, in the electronic device according to the fourth or fifth aspect, the controller receives a user operation to set a predetermined number by the input interface, and generates the sequence information to arrange the predetermined number or less of pieces of the video information for each section.

In a seventh aspect, in the electronic device according to any one of the fourth to sixth aspects, the controller receives the user operation to set a predetermined period by the input interface, and generates the sequence information to arrange the video information with removing the predetermined period in the video.

In an eighth aspect, in the electronic device according to any one of the first to seventh aspects, the management data includes a data structure that causes an external device for displaying the edit screen to display the edit screen with the video information being arranged in accordance with the priority order.

In a ninth aspect, the electronic device according to any one of the first to eighth aspects, further includes a memory that stores management information that manages the video associated with each of the plurality of sections in the scenario. The controller generates the management data, based on the management information and the rating information.

In a tenth aspect, the electronic device according to any one of the first to ninth aspects, further includes a communication interface that communicates data with an imaging apparatus for shooting the video. The controller manages a video shot with the imaging apparatus by data communication via the communication interface.

In an eleventh aspect, the electronic device according to any one of the first to tenth aspects, further includes an image sensor that captures a subject image to generate image data. The controller manages the video including the image data generated by the image sensor.

A twelfth aspect is a video management method for managing a video in a scenario including a plurality of sections. The method includes: causing, by a controller of an electronic device, a display to display a rating screen to acquire rating information from an input interface, the rating screen prompting a user to rate the video associated with each section of the plurality of sections, and the rating information indicating user rating of the video; and generating, by the controller, management data in accordance with the acquired rating information, the management data managing a priority order in which video information is arranged on an edit screen for editing a plurality of videos associated with the plurality of sections, and the video information indicating each of the videos.

A thirteenth aspect is a non-transitory computer-readable recording medium storing a program that causes the controller to execute the video management method according to the twelfth aspect.

As described above, the embodiments have been described as an example of the technology in the present disclosure. For this purpose, the accompanying drawings and the detailed description have been provided. Accordingly, some of the components described in the accompanying drawings and the detailed description may include not only essential components for solving the problem but also components which are not essential for solving the problem in order to describe the above technology.

The present disclosure is applicable to various uses for shooting a video including a plurality of cuts.

The invention claimed is:

1. An electronic device for managing a video in a scenario including a plurality of sections, the electronic device comprising:

a display that displays information;

an input interface that inputs a user operation; and a controller that controls the display in accordance with the user operation input by the input interface, wherein the controller causes the display to display a rating screen to acquire rating information from the input interface, the rating screen prompting the user to rate the video associated with each section of the plurality of sections, the rating information indicating user rating of the video, and generates management data defining an initial layout of video information on an edit screen in accordance with the acquired rating information, the initial layout having a priority order in which the video information is arranged on the edit screen based on the rating information for each section, the edit screen being for subsequent user editing of a plurality of videos associated with the plurality of sections, and the video information indicating each of the videos.

2. The electronic device according to claim 1, wherein the controller generates the management data in accordance with the acquired rating information to arrange the video information on the edit screen for each section with a higher priority as the video information indicates the video having a higher rating indicated by the rating information.

3. The electronic device according to claim 1, wherein the management data includes a plurality of folders indicating the priority order based on the rating information for each section, and defines the video to be stored in each of the plurality of folders.

4. The electronic device according to claim 1, wherein the management data includes sequence information in which the video information is arranged in an order of the plurality of sections in the scenario, and the controller generates the sequence information to arrange the video information in accordance with the priority order for each section.

5. The electronic device according to claim 4, wherein the controller generates the sequence information to align arrangement of the video information for each section, based on a time length of the video for each section.

6. The electronic device according to claim 4, wherein the controller receives a user operation to set a predetermined number by the input interface, and generates the sequence information to arrange the predetermined number or less of pieces of the video information for each section.

7. The electronic device according to claim 4, wherein the controller receives the user operation to set a predetermined period by the input interface, and generates the sequence information to arrange the video information with removing the predetermined period in the video.

8. The electronic device according to claim 1, wherein the management data includes a data structure that causes an external device for displaying the edit screen to display the edit screen with the video information being arranged in accordance with the priority order.

9. The electronic device according to claim 1, further comprising a memory that stores management information that manages the video associated with each of the plurality of sections in the scenario, wherein the controller generates the management data, based on the management information and the rating information.

10. The electronic device according to claim 1, further comprising a communication interface that communicates data with an imaging apparatus for shooting the video, wherein the controller manages a video shot with the imaging apparatus by data communication via the communication interface.

11. The electronic device according to claim 1, further comprising an image sensor that captures a subject image to generate image data, wherein the controller manages the video including the image data generated by the image sensor.

12. The electronic device according to claim 1, wherein the controller generates the management data such that, in the initial layout, the video information for each section of the plurality of sections is arranged on the edit screen from a higher rating to a lower rating within each section based on the acquired rating information.

13. A video management method for managing a video in a scenario including a plurality of sections, the method comprising:

causing, by a controller of an electronic device, a display to display a rating screen to acquire rating information from an input interface, the rating screen prompting a user to rate the video associated with each section of the plurality of sections, and the rating information indicating user rating of the video; and generating, by the controller, management data defining an initial layout of video information on an edit screen in accordance with the acquired rating information, the initial layout having a priority order in which the video information is arranged on the edit screen based on the rating information for each section, the edit screen being for subsequent user editing of a plurality of videos associated with the plurality of sections, and the video information indicating each of the videos.

14. A non-transitory computer-readable recording medium storing a program that causes the controller to execute the video management method according to claim 13.

* * * * *